(12) United States Patent
Okada et al.

(10) Patent No.: US 10,214,060 B2
(45) Date of Patent: Feb. 26, 2019

(54) WHEEL POSITION DETECTION DEVICE AND TIRE-PRESSURE DETECTION SYSTEM EQUIPPED WITH SAME

(71) Applicant: DENSO CORPORATION, Kariya, Aichi-pref. (JP)

(72) Inventors: Noriaki Okada, Kariya (JP); Masahiro Fukuda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/575,006

(22) PCT Filed: May 10, 2016

(86) PCT No.: PCT/JP2016/002293
§ 371 (c)(1),
(2) Date: Nov. 17, 2017

(87) PCT Pub. No.: WO2016/194306
PCT Pub. Date: Dec. 8, 2016

(65) Prior Publication Data
US 2018/0134102 A1 May 17, 2018

(30) Foreign Application Priority Data
Jun. 4, 2015 (JP) ................................. 2015-114240

(51) Int. Cl.
*B60C 23/04* (2006.01)
*G01P 15/00* (2006.01)

(52) U.S. Cl.
CPC ...... *B60C 23/0416* (2013.01); *B60C 23/0488* (2013.01); *B60C 23/0489* (2013.01); *G01P 15/00* (2013.01)

(58) Field of Classification Search
CPC ............ B60C 23/0416; B60C 23/0488; B60C 23/0415; B60C 23/0433; G01P 15/00
(Continued)

(56) References Cited

U.S. PATENT DOCUMENTS

| 5,602,524 A | 2/1997 | Mock et al. |
| 6,218,936 B1 | 4/2001 | Imao |

(Continued)

FOREIGN PATENT DOCUMENTS

| JP | 2000071726 A | 3/2000 |
| JP | 3212311 B2 | 9/2001 |

(Continued)

*Primary Examiner* — John A Tweel, Jr.
(74) *Attorney, Agent, or Firm* — Harness, Dickey & Pierce, P.L.C.

(57) ABSTRACT

A wheel position detection device includes: a transmitter in each wheel of a vehicle having a first control unit for transmitting a frame with ID and an acceleration sensor; and a receiver on a vehicle body, including a second control unit for registering the ID in association with the wheel. The first control unit detects a wheel speed, and stores data of the acceleration sensor in the frame. The second control unit includes: a first determination device that determines a condition that the acceleration sensor is not in an on-state; a candidate registration device that registers a candidate of the ID of a spare wheel when the condition is satisfied; a second determination device that determines a travel history of the vehicle; and a registration device that identifies the ID of the spare wheel when the travel history is present, and registers the ID in association with the spare wheel.

5 Claims, 12 Drawing Sheets

(58) Field of Classification Search
USPC .......................................................... 340/442
See application file for complete search history.

(56) References Cited

U.S. PATENT DOCUMENTS

| | | | |
|---|---|---|---|
| 7,032,441 B2* | 4/2006 | Kanatani | B60C 23/0416 |
| | | | 73/146 |
| 7,262,688 B2* | 8/2007 | Ogawa | B60C 23/0416 |
| | | | 340/442 |
| 7,705,714 B2* | 4/2010 | Mori | B60C 23/0416 |
| | | | 340/438 |
| 9,902,216 B2* | 2/2018 | Wagner | G01P 15/00 |
| 2004/0044450 A1 | 3/2004 | Taguchi et al. | |
| 2005/0033485 A1 | 2/2005 | Nimmo et al. | |
| 2006/0001533 A1 | 1/2006 | Bessho et al. | |
| 2009/0273461 A1 | 11/2009 | Buck | |
| 2015/0183279 A1 | 7/2015 | Okada et al. | |
| 2018/0022171 A1* | 1/2018 | Okada | B60C 23/0416 |

FOREIGN PATENT DOCUMENTS

| | | |
|---|---|---|
| JP | 2005-516848 A | 6/2005 |
| JP | 3661670 B2 | 6/2005 |
| JP | 2006015895 A | 1/2006 |
| JP | 2006015955 A | 1/2006 |
| JP | 5585595 B2 | 9/2014 |
| JP | 2015051746 A | 3/2015 |
| JP | 2016137845 A | 8/2016 |
| WO | WO-2016121365 A1 | 8/2016 |

* cited by examiner

FIRST RECEIVE

SECOND RECEIVE

THIRD RECEIVE

| RECEPTION | TIME(t) | TOOTH POSITION AT THE TIME OF RECEPTION (0-95) | | | | WHEEL POSITION IDENTIFICATION LOGIC (TRUE or FALSE) | | | |
|---|---|---|---|---|---|---|---|---|---|
| | | FL | FR | RL | RR | FL | FR | RL | RR |
| RECEPTION1 | 0.0 | 68 | 92 | 62 | 78 | — | — | — | — |
| RECEPTION2 | 5.1 | 56 | 42 | 38 | 8 | TRUE | FALSE | TRUE | FALSE |
| RECEPTION3 | 10.3 | 72 | 26 | 42 | 72 | TRUE | | TRUE | |
| RECEPTION4 | 14.3 | 60 | 62 | 22 | 6 | TRUE | | FALSE | |

| RECEPTION | TIME(t) | TOOTH POSITION AT THE TIME OF RECEPTION (0-95) | | | | WHEEL POSITION IDENTIFICATION LOGIC (TRUE or FALSE) | | | |
|---|---|---|---|---|---|---|---|---|---|
| | | FL | FR | RL | RR | FL | FR | RL | RR |
| RECEPTION1 | 0.0 | 38 | 68 | 30 | 50 | — | — | — | — |
| RECEPTION2 | 4.1 | 2 | 78 | 80 | 46 | FALSE | TRUE | FALSE | TRUE |
| RECEPTION3 | 8.3 | 42 | 74 | 14 | 28 | | TRUE | | TRUE |
| RECEPTION4 | 12.4 | 88 | 78 | 52 | 22 | | TRUE | | FALSE |

| RECEPTION | TIME(t) | TOOTH POSITION AT THE TIME OF RECEPTION (0-95) | | | | WHEEL POSITION IDENTIFICATION LOGIC (TRUE or FALSE) | | | |
|---|---|---|---|---|---|---|---|---|---|
| | | FL | FR | RL | RR | FL | FR | RL | RR |
| RECEPTION1 | 0.0 | 62 | 94 | 54 | 76 | — | — | — | — |
| RECEPTION2 | 4.5 | 80 | 66 | 60 | 32 | TRUE | FALSE | TRUE | FALSE |
| RECEPTION3 | 9.0 | 92 | 40 | 64 | 88 | FALSE | | TRUE | |

| RECEPTION | TIME(t) | TOOTH POSITION AT THE TIME OF RECEPTION (0-95) | | | | WHEEL POSITION IDENTIFICATION LOGIC (TRUE or FALSE) | | | |
|---|---|---|---|---|---|---|---|---|---|
| | | FL | FR | RL | RR | FL | FR | RL | RR |
| RECEPTION1 | 0.0 | 36 | 86 | 24 | 62 | — | — | — | — |
| RECEPTION2 | 4.5 | 0 | 6 | 74 | 64 | FALSE | TRUE | FALSE | TRUE |
| RECEPTION3 | 8.6 | 62 | 24 | 30 | 70 | | FALSE | | TRUE |

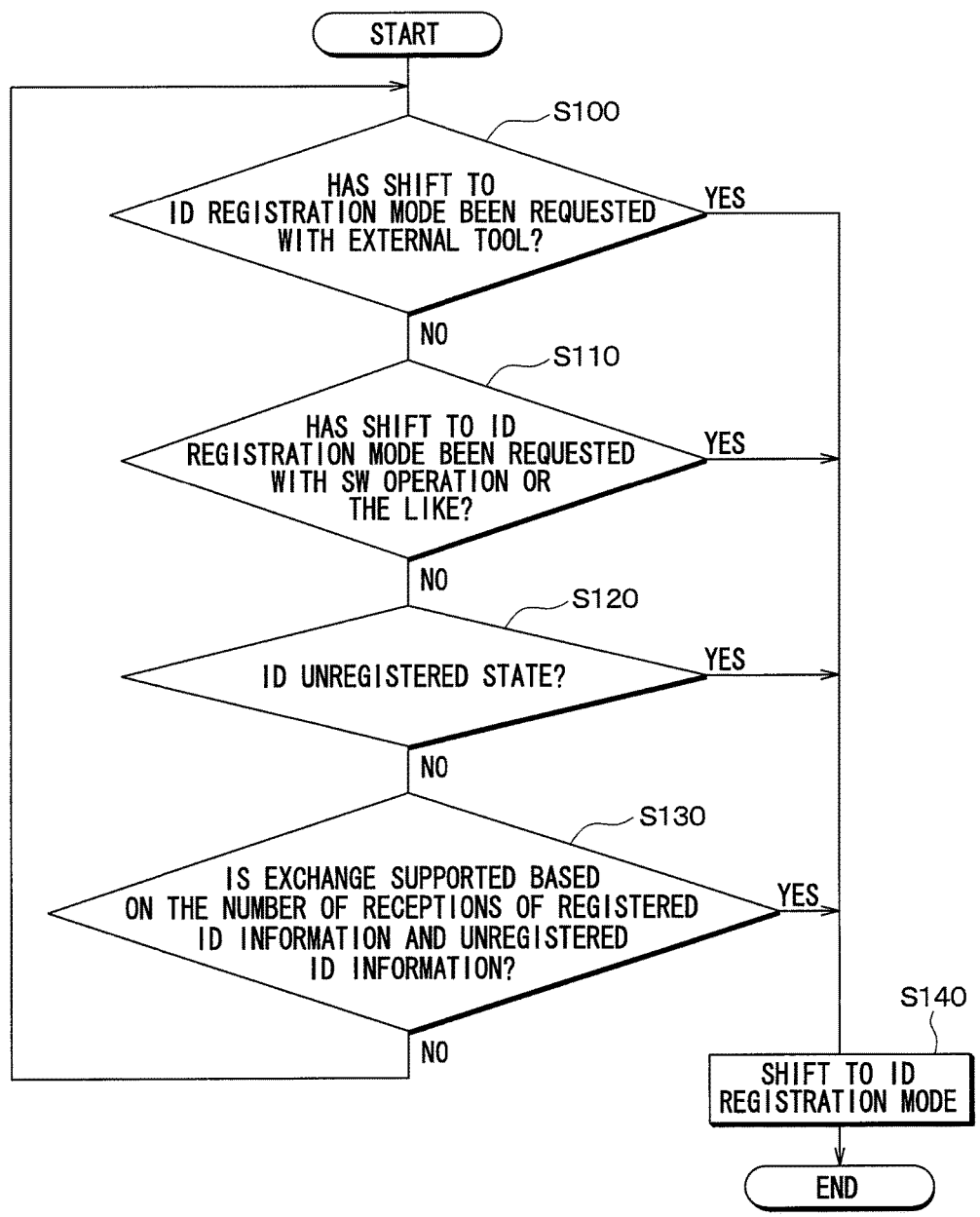

FIG. 11

| FIRST PARKING LOT | | SECOND PARKING LOT | |
|---|---|---|---|
| REGISTERED CANDIDATE ID | THE NUMBER OF RECEPTION | REGISTERED CANDIDATE ID | THE NUMBER OF RECEPTION |
| ID00 | 5 | ID00 | 20 |
| ID0A | 5 | ID0a | 2 |
| ID0B | 4 | ID0b | 1 |
| ID0C | 4 | ID0c | 2 |
| ⋮ | ⋮ | ⋮ | ⋮ |
| ID0X | 3 | ID0x | 3 |

WHEEL POSITION DETECTION DEVICE AND TIRE-PRESSURE DETECTION SYSTEM EQUIPPED WITH SAME

CROSS REFERENCE TO RELATED APPLICATIONS

This application is a U.S. National Phase Application under 35 U.S.C. 371 of International Application No. PCT/JP2016/002293 filed on May 10, 2016 and published in Japanese as WO 2016/194306 A1 on Dec. 8, 2016. This application is based on and claims the benefit of priority from Japanese Patent Application No. 2015-114240 filed on June 4, 2015. The entire disclosures of all of the above applications are incorporated herein by reference.

TECHNICAL FIELD

The present disclosure relates to a wheel position detection device that automatically detects where a target wheel is mounted in a vehicle and a direct type tire pressure detection system equipped with the same.

BACKGROUND ART

Up to now, as one of tire pressure detection systems (hereinafter referred to as TPMS: tire pressure monitoring system), there is a direct type tire pressure detection system. In the TPMS of that type, a transmitter equipped with a sensor such as a pressure sensor is attached directly to a wheel side to which a tire is attached. An antenna and a receiver are provided on a vehicle body side. When a detection signal from the sensor is transmitted from the transmitter, the detection signal is received by the receiver through an antenna to detect the tire pressure.

In such a direct type TPMS, there is a need to discriminate whether transmitted data belongs to a host vehicle, or not, and to which wheel the transmitter is attached. For that reason, ID information for discriminating whether the transmitted data belongs to the host vehicle or another vehicle and for discriminating to which wheel the transmitter is attached is allocated to data to be transmitted by the transmitter, individually.

In order to identify a position of the transmitter from the ID information included in the transmitted data, there is a need to previously register the ID information on each transmitter on the receiver side in association with the position of each wheel. For that reason, when rotating the tires or exchanging the tires for winter, there is a need to again register the ID information of the transmitter and a positional relationship of the wheels in the receiver, and a user cannot freely change the tires. Therefore, a system that can automatically register the ID information is required. Therefore, for example, Patent Literature 1 has proposed a technique for automatically registering the ID information.

More specifically, the device disclosed in Patent Literature 1 detects that the wheel reaches a predetermined rotational position (rotation angle) based on an acceleration detection signal of an acceleration sensor provided in the transmitter on the wheel side, and performs frame transmission from the wheel side. When the user performs a registration instruction operation, the passage of teeth of a gear rotated in conjunction with the wheel is detected by a wheel speed sensor, and the wheel position is identified based on a variation range of a tooth position at a reception timing of the frame.

In addition, there is another method to pay attention to respective reception frequencies of multiple pieces of received unknown ID information during a fixed period, and register ID information with a high frequency as ID information of the host vehicle. Also, there is a method to obtain a correlation of a travel pattern of the host vehicle with a temperature and a pressure in a tire based on temperature and pressure information in the tire included in a transmission frame including the multiple pieces of unknown ID information received, and register the ID information corresponding to the travel pattern of the host vehicle as the ID information on the host vehicle. Further, there is a method to place an antenna in the vicinity of each wheel, measure an intensity (RSSI) of a received radio wave when the antenna receives a frame, and register the intensity of a large value as the ID information of the wheel in the vicinity of the antenna.

PRIOR ART LITERATURES

Patent Literature

Patent Literature 1: Japanese Patent No. 5585595

SUMMARY

However, according to the conventional methods of registering the ID information, the ID information on the receivers attached to both of traveling wheels and a spare wheel (auxiliary wheel) in the host vehicle cannot be registered while specifying the wheel position. For example, according to the method of Patent Literature 1, since the spare wheel cannot be rotated with traveling, no acceleration associated with traveling occurs and the ID information on the spare wheel is excluded from the ID information on the host vehicle. In addition, in the method paying attention to the reception frequency, since the reception frequency is the same between the traveling wheels and the spare wheel, even though the reception frequency can be registered as the ID information on the host vehicle, the respective ID information cannot be registered with the identification of the wheel positions. In the method using the travel pattern, the ID information on the spare wheel is excluded from the ID information on the host vehicle because there is no fluctuation in temperature and pressure in the tire associated with traveling with respect to the spare wheel.

Also, in the case of the technique in which the antenna is disposed in the vicinity of each wheel, the ID information on each wheel including the spare wheel can be registered with the placement of the antennas also in the vicinity of the spare wheel. However, an additional component such as an antenna for each wheel is required, which leads to an increase in the number of components and hence an increase in cost.

It is an object of the present disclosure to provide a wheel position detection device capable of accurately registering ID information on a transmitter attached to a spare wheel without any provision of an antenna for each wheel and a tire pressure detection system including the wheel position detection device.

According to a first aspect of the present disclosure, a wheel position detection device for a vehicle, in which a plurality of wheels including a traveling wheel having a tire and a spare wheel are attached to a vehicle body, includes:

a transmitter that is disposed in each of the plurality of wheels, and includes a first control unit for creating and transmitting a frame with unique identification information;

and a receiver that is disposed on a vehicle body side, and includes a second control unit for performing a wheel position detection to receive the frame transmitted from the transmitter through a reception antenna when shifting to a predetermined registration mode, to identify which wheel the transmitter that transmits the frame is attached to, according to the unique identification information in the frame, and to register the identification information of the transmitter disposed in each of the plurality of wheels in association with one of the plurality of wheels. The transmitter includes an acceleration sensor for outputting a detection signal corresponding to an acceleration which varies with a rotation of one of the wheels which the transmitter is attached to, and has a function as a function of the first control unit for detecting a feature that a wheel speed of the one of the wheels which the transmitter is attached to reaches a predetermined speed at which the acceleration sensor is in an on-state to detect the acceleration, and for storing data indicative of a state of the acceleration sensor in the frame based on a detection result of the feature. The second control unit of the receiver includes: a first determination device that determines whether the data indicative of the state of the acceleration sensor stored in a received frame satisfies a condition in which the acceleration sensor is not in the on-state; a candidate registration device that registers a candidate of the identification information of the spare wheel when the first determination device determines that the condition is satisfied; a second determination device that determines whether a travel history of the vehicle is present after shifting to the registration mode; and a registration device that identifies the identification information of the spare wheel among registered candidates of the identification information of the spare wheel when the second determination device determines that the travel history is present, and registers the identification information in association with the spare wheel.

As in the wheel position detection device described above, it is determined whether data indicating that the vehicle state is not in the state where the acceleration sensor is on during traveling is stored, or not, and only the ID information of the frame in which the data is stored during traveling is registered as a candidate of the identification information on the spare wheel.

The identification information on the spare wheel is identified from the identification information registered as the candidate. More specifically, it is confirmed that there is a travel history after shifting to the registration mode, and only when there is the travel history, the data belonging to the host vehicle and the data belonging to other vehicles are discriminated from each other in the frames in which the data indicating that the acceleration sensor is not on is stored. This makes it possible to prevent the determination of the identification information on the spare wheel from being performed when the identification information on the transmitter of the spare wheel in the host vehicle is not registered as the candidate due to a full capacity of a memory or the like. Therefore, the identification information on the transmitters of the surrounding vehicles, the loaded other vehicles or the loaded wheels can be prevented from being erroneously registered as the identification information on the transmitter of the spare wheel in the host vehicle.

According to a second aspect of the present disclosure, a tire pressure detection system includes: the wheel position detection device according to the first aspect. The transmitter further includes a sensing unit for outputting a detection signal corresponding to an air pressure of the tire equipped in each of the plurality of wheels. The transmitter stores information, relating to the air pressure of the tire obtained by processing the detection signal from the sensing unit through the first control unit, in the frame, and transmits the frame to the receiver. The second control unit in the receiver detects the air pressure of the tire equipped in each of the plurality of wheels based on the information relating to the air pressure of the tire.

In the tire pressure detection system described above, the determination of the identification information on the spare wheel can be prevented from being performed when the identification information on the transmitter of the spare wheel in the host vehicle is not registered as the candidate due to a full capacity of a memory or the like. Therefore, the identification information on the transmitters of the surrounding vehicles, the loaded other vehicles or the loaded wheels can be prevented from being erroneously registered as the identification information on the transmitter of the spare wheel in the host vehicle.

BRIEF DESCRIPTION OF DRAWINGS

The above and other objects, features and advantages of the present disclosure will become more apparent from the following detailed description made with reference to the accompanying drawings. In the drawings:

FIG. 6A is a table illustrating an evaluation result of a wheel position of ID1;

FIG. 6B is a table illustrating an evaluation result of a wheel position of ID2;

FIG. 6C is a table illustrating an evaluation result of a wheel position of ID3;

FIG. 6D is a table illustrating an evaluation result of a wheel position of ID4;

FIG. 7 is a flowchart of a registration start determination process to be executed by the TPMS-ECU 3;

FIG. 11 is a table illustrating a relationship between candidates ID registered when parking in a first parking lot after entering a registration mode and parking in a second parking lot and the number of receptions.

EMBODIMENTS

Hereinafter, embodiments of the present disclosure will be described based on the drawings. In the following respective embodiments, parts identical with or equivalent to each other are denoted by the same symbols for description.

(First Embodiment)

Figure 1:
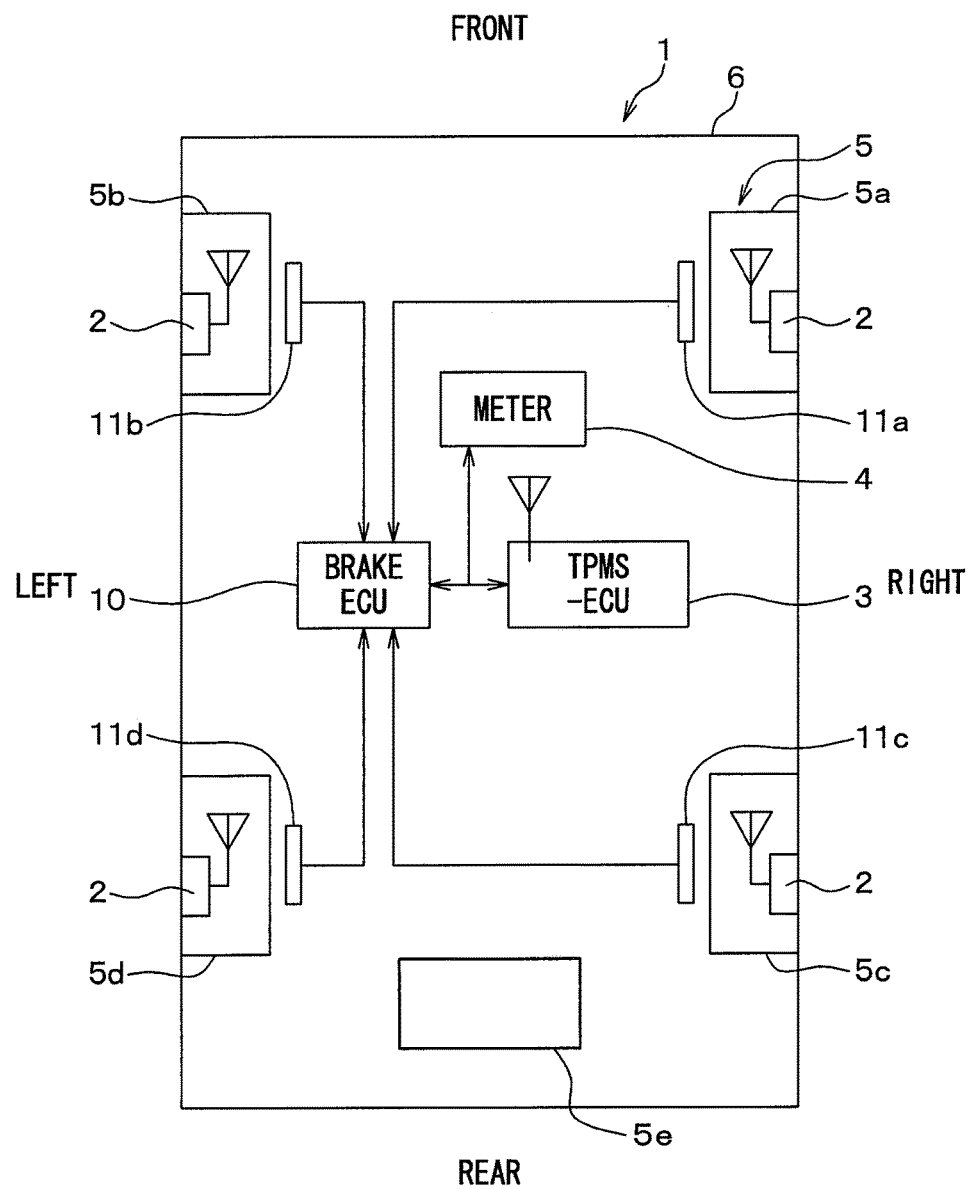
FIG. 1 is a diagram illustrating an overall configuration of a tire pressure detection device to which a wheel position detection device is applied according to a first embodiment of the present disclosure.

A first embodiment of the present disclosure will be described with reference to the drawings. FIG. 1 is a diagram illustrating an overall configuration of a TPMS to which a wheel position detection device is applied according to a first embodiment of the present disclosure. An upward direction on paper of FIG. 1 coincides with a front of a vehicle 1 and a downward direction on the page coincides with a rear of the vehicle 1. The TPMS according to the present embodiment will be described with reference to the figure.

As illustrated in FIG. 1, the TPMS is provided in the vehicle 1, and is configured to include transmitters 2, an ECU for the TPMS (hereinafter referred to as TPMS-ECU) 3 serving as a receiver, and a meter 4. The wheel position detection device uses the transmitters 2 and the TPMS-ECU 3 provided in the TPMS, and also acquires gear information obtained from detection signals of wheel speed sensors 11a to 11d provided corresponding to respective wheels 5 (5a to 5e) from a brake control ECU (hereinafter referred to as brake ECU) 10, to thereby identify wheel positions.

As illustrated in FIG. 1, the transmitters 2 are attached to the respective wheels 5a to 5e including the traveling wheels 5a to 5d and the spare wheel 5e. The transmitters 2 detect air pressures of the tires attached to the respective wheels 5a to 5e, and stores information on the tire pressures indicative of detection results in a frame together with ID information unique to the respective transmitters 2 and transmit the frame. Acceleration on data (hereinafter referred to as G-ON data) indicating that an acceleration sensor 22 to be described later is turned on or acceleration off data (hereinafter referred to as G-OFF data) indicating that the acceleration sensor 22 is not turned on is stored in the frame. Those G-ON data and G-OFF data correspond to data indicating the state of the acceleration sensor 22. Although the acceleration sensor 22 constantly detects an acceleration, when a wheel speed reaches a predetermined speed, an acceleration component in a centrifugal direction becomes sufficiently larger than the other components so as to perform accurate acceleration detection. That the acceleration sensor 22 accurately detects the acceleration represents that the acceleration sensor 22 is in an on state. Each of the transmitters 2 has a function of detecting that the acceleration sensor 22 is turned on, stores G-ON data or G-OFF data in the frame based on the detection result. For example, each of the transmitters 2 is provided with a physical switch (not illustrated) in which a movable contact displaced according to the acceleration in the centrifugal direction comes in contact with a fixed contact. When the physical switch is turned on and rendered conductive, the transmitter 2 detects that the acceleration sensor 22 is turned on.

On the other hand, the TPMS-ECU 3 is attached to a vehicle body 6 side of the vehicle 1, receives the frame transmitted from the transmitter 2. The TPMS-ECU 3 performs various processes, calculations, and the like based on the detection signal stored in the frame, to thereby perform a wheel position detection and a tire pressure detection.

Figure 2A:
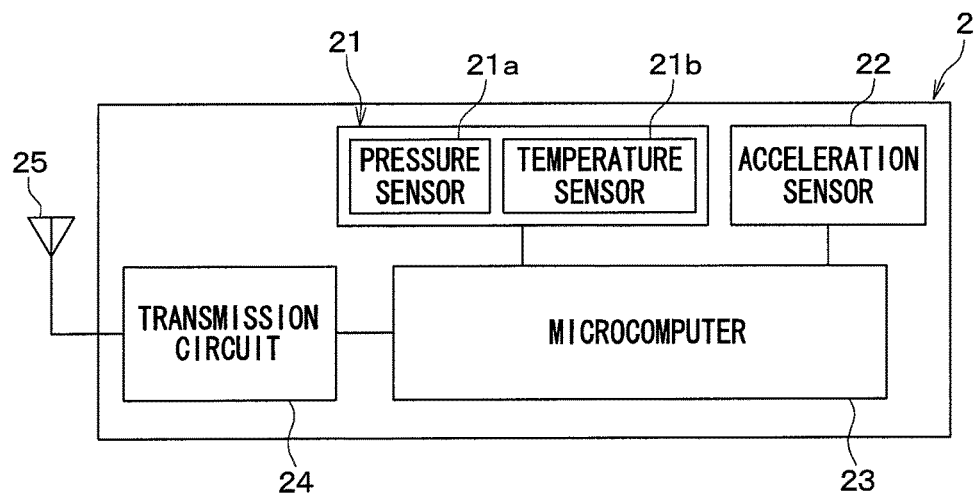
FIG. 2A is a diagram illustrating a block configuration of a transmitter 2.
Figure 2B:
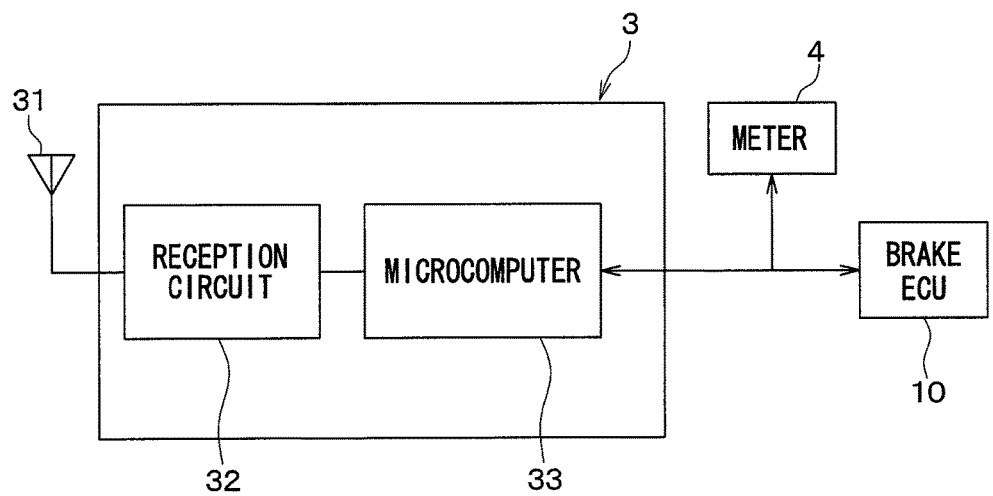
FIG. 2B is a diagram illustrating a block configuration of a TPMS-ECU 3.

Each of the transmitters 2 creates a frame by, for example, FSK (frequency shift keying), and the TPMS-ECU 3 demodulates the frame to read the data in the frame, and performs the wheel position detection and the tire pressure detection. FIGS. 2A and 2B illustrate block configurations of each transmitter 2 and the TPMS-ECU 3.

As illustrated in FIG. 2A, the transmitter 2 is configured to include a sensing unit 21, the acceleration sensor 22, a microcomputer 23, a transmission circuit 24, and a transmission antenna 25, and the respective components are driven based on a power supply from a battery not shown.

The sensing unit 21 is configured to include, for example, a diaphragm-type pressure sensor 21a and a temperature sensor 21b, and outputs a detection signal corresponding to the tire pressure and a detection signal corresponding to a temperature. The acceleration sensor 22 is used for detecting a position of the sensor per se at each of the traveling wheels 5a to 5d to which the respective transmitters 2 are attached, that is, for detecting the position of each transmitter 2 and detecting a vehicle speed. For example, the acceleration sensor 22 according to the present embodiment outputs the detection signal corresponding to an acceleration in a radial direction of each of the traveling wheels 5a to 5d, in other words, in both directions perpendicular to a circumferential direction among the accelerations acting on the traveling wheels 5a to 5d when the traveling wheels 5a to 5d rotate.

The microcomputer 23 is a known device including a control unit (first control unit) and the like, and executes a predetermined process according to a program stored in a memory in the control unit. Individual ID information including identification information unique to the transmitter for identifying each transmitter 2 and identification information unique to the vehicle for identifying a host vehicle is stored in a memory in the control unit.

The microcomputer 23 receives a detection signal relating to the tire pressure from the sensing unit 21, subjects the detection signal to signal processing, processes the detection signal as necessary, and stores the information on the tire pressure together with the ID information of each transmitter 2 in the frame. In addition, the microcomputer 23 monitors the detection signal of the acceleration sensor 22, detects the position (angle detection) of the transmitter 2 at each of the traveling wheels 5a to 5d to which the respective transmitters 2 are attached, and detects the vehicle speed. When creating the frame, the microcomputer 23 performs the frame transmission (data transmission) from the transmission antenna 25 toward the TPMS-ECU 3 through the transmission circuit 24 based on the result of the position detection and the result of the vehicle speed detection of each transmitter 2.

More specifically, the microcomputer 23 starts the frame transmission on the condition that the vehicle 1 is traveling, and repetitively transmits the frame at timing when an angle of the acceleration sensor 22 reaches a predetermined angle based on the detection signal of the acceleration sensor 22. The fact that the vehicle is traveling is determined based on the result of the vehicle speed detection and the angle of the acceleration sensor 22 is determined based on the result of the position detection of each transmitter 2 based on the detection signal of the acceleration sensor 22.

In other words, the microcomputer 23 detects the vehicle speed with the use of the detection signal of the acceleration sensor 22, and when the vehicle speed becomes equal to or higher than a predetermined speed (for example, 5 km/h), it is determined that the vehicle 1 is traveling. The output of the acceleration sensor 22 includes an acceleration (centrifugal acceleration) based on a centrifugal force. The centrifugal acceleration is integrated and multiplied by a coefficient, thereby being capable of calculating the vehicle speed. For that reason, the microcomputer 23 calculates the centrifugal acceleration by removing a gravitational acceleration component from an output of the acceleration sensor 22, and calculates the vehicle speed based on the centrifugal acceleration.

In addition, since the acceleration sensor 22 outputs the detection signal corresponding to the rotation of each of the traveling wheels 5a to 5d, a gravitational acceleration component is included in the detection signal at the time of traveling, and the detection signal has an amplitude corresponding to the wheel rotation. For example, the amplitude of the detection signal is a negative maximum amplitude when the transmitter 2 is located at an upper position with respect to a center axis of each of the traveling wheels 5a to 5d, is zero when the transmitter 2 is located at a horizontal position, and is a positive maximum amplitude when the transmitter 2 is located at a lower position. For that reason, the position of the acceleration sensor 22 can be detected based on the amplitude, and the angle of the position of each transmitter 2, for example, an angle defined by the acceleration sensor 22 which is set to 0° when the acceleration sensor 22 is located at an upper position with respect to the center axis of each of the traveling wheels 5a to 5d can be grasped.

Therefore, the frame transmission from each transmitter 2 is performed at the same time when the vehicle speed reaches the predetermined speed, or as a start timing when the acceleration sensor 22 reaches the predetermined angle after the vehicle speed reaches the predetermined speed. Then, the frame is repeatedly transmitted at the timing when the angle defined by the acceleration sensor 22 becomes the same as that at the time of a first frame transmission, as the transmission timing. The transmission timing may be set every time the angle defined by the acceleration sensor 22 becomes the same as that at the time of the first frame transmission. Alternatively, taking a battery life into consideration, it is preferable to transmit the frame, for example, only once for a predetermined time (for example, 15 seconds) without always transmitting the frame every time the angle is reached.

The transmission circuit 24 functions as an output unit that transmits the frame transmitted from the microcomputer 23 toward the TPMS-ECU 3 through the transmission antenna 25. For the frame transmission, for example, radio waves of RF band are used.

The transmitter 2 configured described above is attached to, for example, an air injection valve in the wheel of each of the wheels 5a to 5e, and disposed so that the sensing unit 21 is exposed to the inside of the tire. Then, each transmitter 2 detects the tire pressure of the wheel to which the transmitter 2 is attached. When the vehicle speed exceeds the predetermined speed as described above, the transmitter 2 repetitively transmits the frame through the transmission antenna 25 provided in each of the transmitters 2 at the timing when the angle of the acceleration sensor 22 of each of the traveling wheels 5a to 5d becomes a predetermined angle. Even thereafter, the transmitter 2 can perform the frame transmission at the timing when the angle of the acceleration sensor 22 of each of the traveling wheels 5a to 5d becomes equal to the predetermined angle. However, because it is preferable to lengthen a transmission interval in consideration of the battery life when a time assumed to be required for the wheel position detection elapses, the mode is switched from a wheel position determination mode to a regular transmission mode, and the frame is transmitted at a longer fixed cycle (for example, every 1 minute), thereby periodically transmitting a signal related to the tire pressure to the TPMS-ECU 3 side. At that time, for example, with the provision of a random delay for each transmitter 2, the transmission timing of each transmitter 2 can be shifted from each other, and the frame can be prevented from being not received by the TPMS-ECU 3 side due to interference of radio waves from the multiple transmitters 2.

As illustrated in FIG. 2B, the TPMS-ECU 3 includes a reception antenna 31, a reception circuit 32, a microcomputer 33, and the like. The TPMS-ECU 3 acquires gear information from a brake ECU 10 as described later, through an in-vehicle LAN such as a CAN, to thereby acquire a tooth position indicated by the number of edges (or the number of teeth) of teeth of a gear rotated together with each of the traveling wheels 5a to 5d.

The reception antenna 31 is configured to receive the frame transmitted from each transmitter 2. The reception antenna 31 is fixed to the vehicle body 6, and may be configured by an internal antenna disposed inside of a main body of the TPMS-ECU 3, or may be configured by an external antenna having a wire extending from the main body.

The reception circuit 32 functions as an input unit that receives a transmission frame from each transmitter 2 which is received by the reception antenna 31 and transmits the frame to the microcomputer 33. Upon receiving the signal (frame) through the reception antenna 31, the reception circuit 32 transmits the received signal to the microcomputer 33.

The microcomputer 33 corresponds to a second control unit, and executes a wheel position detection process according to a program stored in a memory in the microcomputer 33. Specifically, the microcomputer 33 detects the wheel position based on a relationship between the information acquired from the brake ECU 10 and a reception timing at which the transmission frame from each transmitter 2 is received. The microcomputer 33 acquires, from the brake ECU 10, the gear information on the wheel speed sensors 11a to 11d provided corresponding to the respective traveling wheels 5a to 5d in addition to the wheel speed information on the respective traveling wheels 5a to 5d, every predetermined cycle (for example, 10 ms).

The gear information is information indicating the tooth position of the gear (gear) rotated together with the respective traveling wheels 5a to 5d. Each of the wheel speed sensors 11a to 11d are configured by, for example, an electromagnetic pickup type sensor disposed to face the teeth of the gear, and changes the detection signal with the passage of the teeth of the gears. Since the wheel speed sensors 11a to 11d of this type output rectangular pulse waves corresponding to the passage of teeth as the detection signals, rising and falling edges of the rectangular pulse waves represent the passage of the edges of the teeth of the gears. Therefore, the brake ECU 10 counts the number of edges of the gear teeth, that is, the number of passing edges from the number of rising and falling edges of the detection signals of the wheel speed sensors 11a to 11d, and delivers the number of teeth edges at that time to the microcomputer 33 as gear information indicative of the tooth position at every predetermined cycle. With the above configuration, the microcomputer 33 can grasp the timing when which tooth of the gear has passed.

The number of tooth edges is reset each time the gear rotates once. For example, when the number of teeth provided in the gear is 48, the number of edges is counted in a total of 96 from 0 to 95, and when the count value reaches 95, the number is again returned to 0 and counted.

In this case, the number of edges of the teeth of the gear is transmitted to the microcomputer 33 as the gear information from the brake ECU 10. Alternatively, the number of teeth which is the count value of the number of passed teeth may be applied. In addition, the number of edges or the number of teeth that have passed during the predetermined cycle may be transmitted to the microcomputer 33. The microcomputer 33 may add the number of edges or the number of teeth which have passed during the predetermined cycle to the previous number of edges or the previous number of teeth, and may count the number of edges or the number of teeth in that cycle. In other words, the microcomputer 33 may finally acquire the number of edges or the number of teeth in that cycle as the gear information. In addition, the brake ECU 10 resets the number of edges of the teeth (or the number of teeth) of the gear each time the power is turned off. The brake ECU 10 again measures the number of edges at the same time when the power is turned on, or at the time when the vehicle speed reaches a predetermined value after the power is turned on. In this way, even if the number of edges is reset every time the power is turned off, the same tooth are represented by the same number of edges (or the number of teeth) while the power is on.

When the microcomputer 33 receives the frame transmitted from each transmitter 2, the microcomputer 33 measures a reception timing, and detects the wheel position based on the number of edges (or the number of teeth) at the reception timing of the frame from among the acquired number of edges (or the number of teeth) of the gear. This makes it possible to detect the wheel position that specifies which of the traveling wheels 5a to 5d each transmitter 2 is attached to. A specific method of detecting the wheel position will be described later in detail.

Further, the microcomputer 33 stores the ID information of each transmitter 2 and the position of each of the traveling wheels 5a to 5d to which the respective transmitters 2 are attached, in association with each other based on the result of the wheel position detection. Thereafter, the microcomputer 33 detects the tire pressure of each of the traveling wheels 5a to 5d based on data related to the ID information and the tire pressures stored in the transmission frame from each of the transmitters 2, and outputs an electric signal corresponding to the tire pressure to the meter 4 through the in-vehicle LAN such as a CAN. For example, the microcomputer 33 detects a decrease in the tire pressure while comparing the tire pressure with a predetermined threshold value Th, and outputs a signal indicative of the decrease in the tire pressure to the meter 4 when detecting the decrease in the tire pressure. As a result, a fact that the tire pressure of any one of the four traveling wheels 5a to 5d has decreased is transferred to the meter 4.

The meter 4 functions as a warning unit, and as illustrated in FIG. 1, the meter 4 is disposed at a position visible to a driver and is configured by, for example, a meter display or the like installed in an instrument panel of the vehicle 1. For example, when the meter 4 receives a signal indicating that the tire pressure has decreased from the microcomputer 33 in the TPMS-ECU 3, the meter 4 displays the decrease in the tire pressure while identifying any one of the traveling wheels 5a to 5d, to thereby notify the driver of the decrease in the tire pressure of a specific wheel.

Subsequently, the operation of the TPMS according to the present embodiment will be described. Hereinafter, the operation of the TPMS will be described, but the detection of the wheel position and the detection of the tire pressure performed by the TPMS will be described, separately. First, a specific method of detecting the wheel position will be described with reference to FIGS. 3 to 6D.

On the transmitter 2 side, the microcomputer 23 monitors the detection signal of the acceleration sensor 22 every predetermined sampling cycle based on a power supply from a battery, to thereby detect the vehicle speed and an angle of the acceleration sensor 22 in each of the wheels 5a to 5e. When the vehicle speed reaches the predetermined speed, the microcomputer 23 repetitively transmits the frames at the timing when the angle of the acceleration sensor 22 reaches the predetermined angle. For example, when the vehicle speed reaches the predetermined speed as a predetermined angle, or when the acceleration sensor 22 reaches the predetermined angle after the vehicle speed has reached the predetermined speed as a start timing, the microcomputer 23 transmits the frame from each transmitter 2. Then, the frame is repeatedly transmitted at the timing when the angle defined by the acceleration sensor 22 becomes the same as that at the time of a first frame transmission, as the transmission timing.

Figure 3:
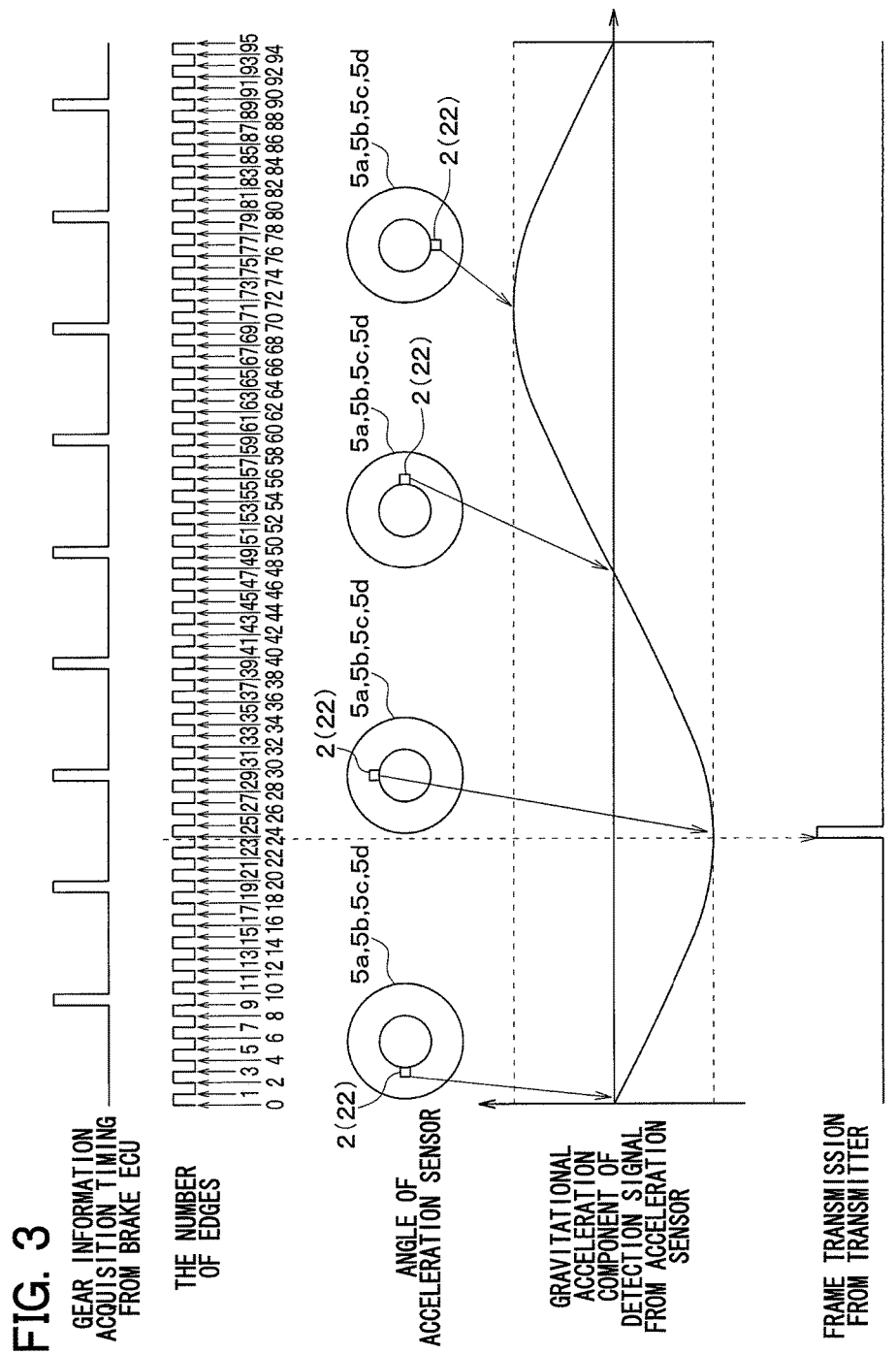
FIG. 3 is a timing chart for illustrating wheel position detection.

In other words, when the gravitational acceleration component of the detection signal from the acceleration sensor 22 is extracted, a sine wave is obtained as illustrated in FIG. 3. The angle of the acceleration sensor 22 is found based on the sine wave. For that reason, the frame transmission is performed at the timing at which the acceleration sensor 22 reaches the same angle based on the sine wave.

On the other hand, the TPMS-ECU 3 side acquires the gear information of the wheel speed sensors 11a to 11d provided corresponding to the respective traveling wheels 5a to 5d from the brake ECU 10 every predetermined period (for example, 10 ms). When receiving the frame transmitted from each transmitter 2, the TPMS-ECU 3 measures the reception timing, and acquires the number of edges (or the number of teeth) of the gear at the reception timing of the frame from among the acquired number of edges (or the number of teeth) of the gear.

At that time, the reception timing of the frame transmitted from each transmitter 2 does not always coincide with the cycle in which the gear information is acquired from the brake ECU 10. For that reason, the number of edges (or the number of teeth) of the gear indicated by the gear information acquired in the cycle closest to the reception timing of the frame, in other words, a cycle immediately before or immediately after the reception timing of the frame from among the cycles in which the gear information has been acquired from the brake ECU 10 can be used as the number of edges (or the number of teeth) of the gear at the reception timing of the frame. In addition, the number of edges (or the number of teeth) of the gear at the reception timing of the frame may be calculated with the use of the number of edges (or the number of teeth) of the gear indicated by the gear information acquired in a cycle immediately before or immediately after the reception timing of the frame from among the cycles in which the gear information has been acquired from the brake ECU 10. For example, an intermediate value of the number of edges (or the number of teeth) of the gear indicated by the gear information acquired in cycles immediately before and immediately after the reception timing of the frame can be used as the number of edges (or the number of teeth) of the gear at the reception timing of the frame.

The operation of acquiring the number of edges (or the number of teeth) of the gear at the reception timing of the frame described above is repeated every time the frame is received, and the wheel position is detected based on the number of edges (or the number of teeth) of the gear at the reception timing of the acquired frame. More specifically, it is determined whether a variation in the number of edges (or the number of teeth) of the gear at the reception timing of the frame falls within a predetermined range set based on the number of edges (or the number of teeth) of the gear at a previous reception timing, or not, to thereby detect the wheel position.

In the wheel that has received the frame, since the frame transmission is performed at the timing at which the angle of the acceleration sensor 22 reaches the predetermined angle, the tooth position indicated by the number of edges (or the number of teeth) of the gear at the reception timing of the frame almost coincides with a previous tooth position. For that reason, the variation in the number of edges (or the number of teeth) of the gear at the reception timing of the frame is small and falls within a predetermined range. The above fact is established even when receiving the frames at multiple times, and the variation in the number of edges (or the number of teeth) of the gear at the reception timing of each frame falls within a predetermined range determined at the first frame reception timing. On the other hand, in the wheel different from the wheel which has received the frame, the tooth position indicated by the number of edges (or the number of teeth) of the gear at the reception timing of the frame transmitted from the transmitter 2 of another wheel varies.

That is, since the rotation of the gears of the wheel speed sensors 11a to 1id is interlocked with the respective traveling wheels 5a to 5d, regarding the wheels that received the frame, the tooth position indicated by the number of edges (or the number of teeth) of the gear at the reception timing of the frame substantially coincide with each other in the wheels that have received the frames. However, because rotating states of the respective traveling wheels 5a to 5d vary due to road situations, turning, a lane change, or the like, the rotating states of the traveling wheels 5a to 5d cannot exactly coincide with each other. For that reason, in the wheels different from the wheel which has received the frame, the tooth position indicated by the number of edges (or the number of teeth) of the gear at the reception timing of the frame varies.

Figure 4:
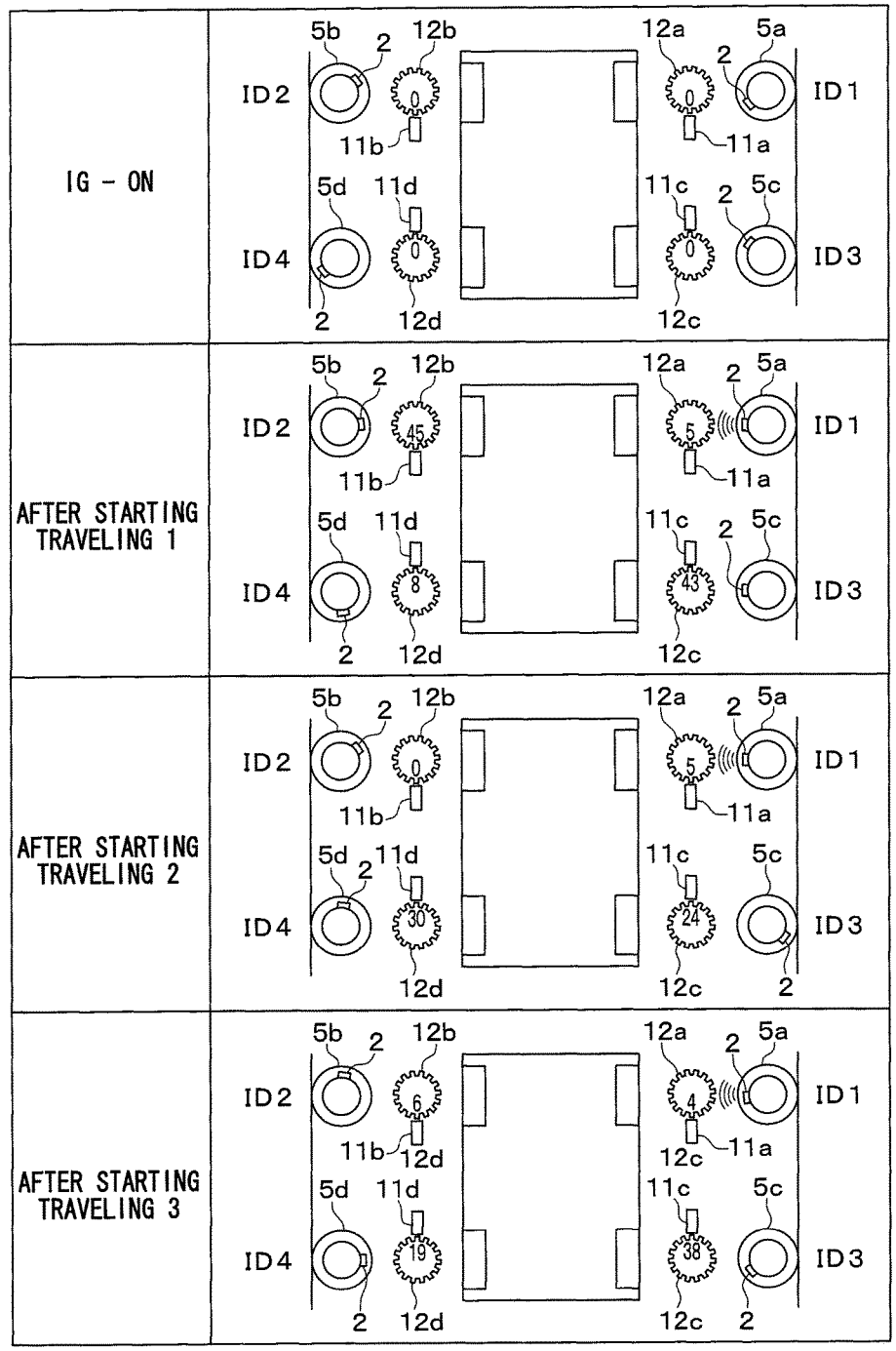
FIG. 4 is an image diagram illustrating a change in gear information.

Therefore, as illustrated in FIG. 4, in the wheel different from the wheel that has gradually received the frame after the vehicle starts traveling from a state where the number of edges of gears 12a to 12d is 0 at the beginning when an ignition switch (IG) turns on, the tooth position indicated by the number of edges (or the number of teeth) of the gear at the reception timing of the frame is varied. It is determined whether the variation falls within a predetermined range, or not, to thereby detect the wheel position.

Figure 5A:
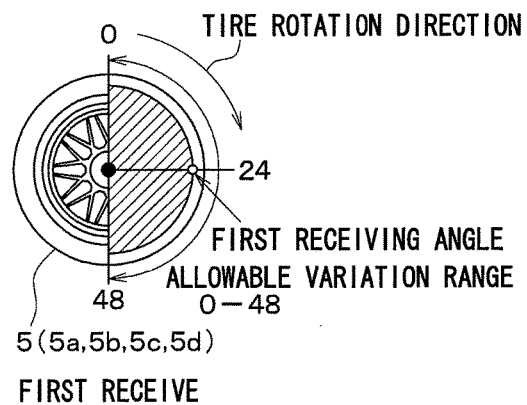
FIG. 5A is a schematic diagram illustrating a wheel position determination logic.
Figure 5B:
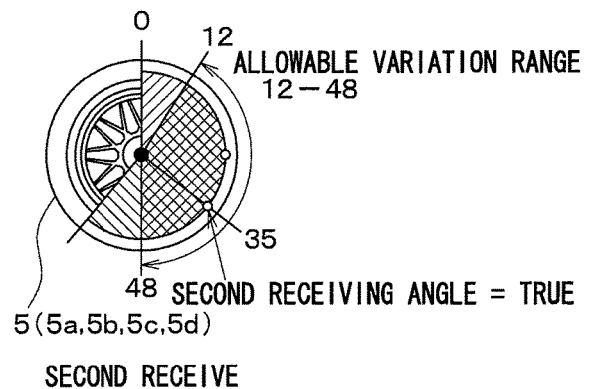
FIG. 5B is a schematic diagram illustrating the wheel position determination logic.

For example, as illustrated in FIG. 5A, it is assumed that a position of the transmitter 2 at a first frame transmission is a first receiving angle. In addition, it is assumed that an allowable variation range which is an allowable range as a variation in the number of edges (or the number of teeth) of the gear is a value corresponding to a range of 180° (a range of the first receiving angle ±90°) centered on the first receiving angle. In the case of the number of edges, it is assumed that the allowable variation range falls within an edge number range ±24 centered on the number of edges at the first receiving time, and in the case of the number of teeth, it is assumed that the allowable variation range falls within a tooth number range ±12 centered on the number of teeth at the first receiving time. In that case, as illustrated in FIG. 5B, if the number of edges (or the number of teeth) of the gear at a second frame receiving time falls within the range of the allowable variation range determined by the first frame reception, the wheel with the number of edges (or the number of teeth) may coincide with the wheel on which the frame transmission is performed, and a second receiving angle is TRUE (correct).

However, also in that case, the allowable variation range is determined centered on the second receiving angle which is an angle of the transmitter 2 at the second frame receiving time, and becomes a value corresponding to 180° (±90°) centered on the second receiving angle. For that reason, a portion where the allowable variation range of 180° (±90°) centered on the first receiving angle which is the previous allowable variation range overlaps with the allowable variation range of 180° (±90°) centered on the second receiving angle becomes a new allowable variation range (an edge number range is 12 to 48), and the new allowable variation range can be narrowed to the overlapping range.

Figure 5C:
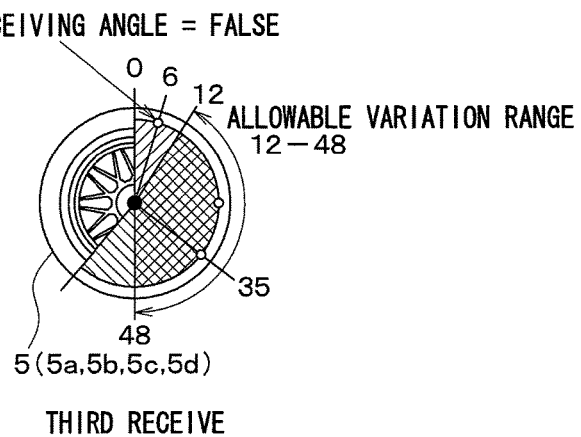
FIG. 5C is a schematic diagram illustrating the wheel position determination logic.

Therefore, as illustrated in FIG. 5C, if the number of edges (or the number of teeth) of the gear at a third frame receiving time falls outside the allowable variation range determined by the first and the second frame receptions, the wheel with the number of edges (or the number of teeth) does not coincide with the wheel on which the frame transmission is performed, and therefore a third receiving angle is FALSE (error). At that time, even if the number of edges falls within the allowable variation range determined by the first frame reception, if the number of edges falls outside the allowable variation range determined by the first and the second frame receptions, the third receiving angle is determined as FALSE. In this manner, it can be identified to which of the traveling wheels 5a to 5d the transmitter 2 that has transmitted the received frame is attached.

In other words, as illustrated in FIG. 6A, in the frame including ID1 as the ID information, the number of edges (or the number of teeth) of the gear is acquired every reception timing of the frame, and stored for each of corresponding wheels (left front wheel FL, right front wheel FR, left rear wheel RL, right rear wheel RR). Every time the frame is received, it is determined whether the number of edges (or the number of teeth) of the acquired gear falls within the allowable variation range, or not, and wheels outside the range are excluded from the wheel candidates to which the transmitter 2 that has transmitted the frame is attached. The wheel not excluded until the end is registered as the wheel to which the transmitter 2 that has transmitted the frame is attached. In the case of the frame including the ID1, the right front wheel FR, the right rear wheel RR, and the left rear wheel RL are excluded from the candidates in the stated order, and the finally left front left wheel FL is registered in association with the ID information as the wheel to which the transmitter 2 that has transmitted the frame is attached.

As illustrated in FIGS. 6B to 6D, the same processing as that of the frame including ID1 is performed for the frames including ID2 to ID4 as the ID information. This makes it possible to identify the wheels to which the transmitter 2 that has transmitted each frame is attached, and makes it possible to identify all four wheels to which each transmitter 2 is attached.

In this manner, it can be identified to which of the traveling wheels 5a to 5d each frame is attached. The microcomputer 33 stores the ID information on each transmitter 2 that has transmitted the frame in association with the position of the wheel to which the transmitter 2 is attached.

The TPMS-ECU 3 stores the gear information at the reception timing upon receiving the frame transmitted when the vehicle speed has reached the predetermined speed. However, when the vehicle speed has reached a predetermined traveling stop determination speed (for example, 5 km/h) or less, the TPMS-ECU 3 discards the previous gear information. When the vehicle starts traveling again, the TPMS-ECU 3 newly detects the wheel position as described above.

The basic wheel position detection is performed by the above technique. This makes it possible to detect the wheel positions of the left front wheel FL, the right front wheel FR, the left rear wheel RL, and the right rear wheel RR which are the traveling wheels 5a to 5d. When a frame transmitted from a transmitter of another vehicle has been received at the time of detecting the wheel position, ID information stored in the frame can also become ID information (hereinafter referred to as a candidate ID) which is a candidate to be registered. However, during the identification of the wheel position using the wheel position identifying logic described above, the timing at which the frame transmitted from the transmitter of another vehicle is received does not coincide with the tooth position of the gear of any wheel of the host vehicle. For that reason, only the ID information on the transmitter 2 of the host vehicle can be registered with the prevention of the ID information on the transmitter of another vehicle from being registered.

In that case, for example, when the following registration method is applied, the ID information on the transmitter of another vehicle can be more prevented from being registered. In other words, in the above wheel position detection, when a frame including ID information from a transmitter attached to a wheel of another vehicle is received during detection of the wheel position in the case where no existing ID information of the host vehicle has been registered at all, the ID information on that transmitter can also be a candidate ID. Likewise, even if the existing ID information on the host vehicle has been registered, the transmitters 2 attached to the traveling wheels 5a to 5d of the host vehicle are replaced with others and the number of ID information of the frame that can be received may be smaller than the number of registered ID information. In such a case, when the frame including the ID information from the transmitter attached to the wheel of another vehicle has been received during the wheel position detection, the ID information on the transmitter can also be a candidate ID.

In those cases, only when the tooth position at the reception timing of the frame consecutively falls within the allowable variation range a predetermined number of times (for example, 10 times) after the wheel has been identified, the ID information is registered.

When receiving the frame of the transmitter attached to the wheel of another vehicle, similarly to the case of the host vehicle, it is determined whether the number of edges (or the number of teeth) of the gear acquired every reception timing of the frame in question falls within the allowable variation range, or not. Similarly to the transmitter 2 of the host vehicle, in the frame transmitted from the transmitter of another vehicle, the wheel falling outside the allowable variation range is excluded from the wheel candidate to which the transmitter 2 that has transmitted the frame is attached. At this time, since an elimination method is used, at the time when only one wheel finally remains without being excluded in each frame, the remaining wheel becomes a wheel candidate to which the transmitter 2 that has transmitted the frame is attached. If the ID information is registered at that time, the ID information on the transmitter attached to the wheel of another vehicle is erroneously registered as that of the host vehicle. In particular, since the frame transmitted from the transmitter attached to the wheel of another vehicle is not the frame of the host vehicle, the frame is likely to vary and tends to be excluded from the wheel candidate earlier than the frames transmitted from the transmitters 2 attached to the traveling wheels 5a to 5d of the host vehicle. For that reason, most of the frames transmitted from the transmitters of the wheels of other vehicles deviate from the allowable variation range at an early stage, and the wheels that have not accidentally deviated from the allowable variation range tend to be identified as the wheel candidates to which the transmitters that have transmitted the frames is attached.

However, if that the tooth position at the reception timing of the frame consecutively falls within the allowable variation range a predetermined number of times after the wheel has been identified is set as a registration condition of the ID information, the tooth position at the reception timing of the frame from the transmitter of another vehicle deviates from the allowable variation range under the registration condition. Therefore, the ID information on the transmitter attached to the wheel of another vehicle can be prevented from being erroneously registered as the ID information of the host vehicle.

This example assumes that it is determined whether or not the tooth position at the reception timing of the frame falls within the allowable variation range consecutively for a predetermined number of times after the wheel has been identified. Alternatively, it may be determined whether or not the tooth position falls within the allowable variation range consequently for a predetermined number of times since a start of the wheel position detection.

As described above, the wheel positions of the left front wheel FL, the right front wheel FR, the left rear wheel RL, and the right rear wheel RR which are the traveling wheels 5a to 5d can be detected through the above technique. However, the wheels whose positions are detected through the above technique are defined by the left front wheel FL, the right front wheel FR, the left rear wheel RL, and the right rear wheel RR which are the traveling wheels 5a to 5d. For that reason, in the present embodiment, a process for identifying the spare wheel 5e is further performed.

More specifically, the TPMS-ECU 3 determines whether there are data indicating the state of the acceleration sensor 22 and a travel history of the host vehicle stored in the received frame, or not, and the ID information on the transmitter 2 of the spare wheel 5e in the host vehicle is also registered based on the determination result. A spare wheel registration process to be executed by the TPMS-ECU 3 will be described with reference to FIGS. 7 and 8. This process is executed together with the wheel position detection process of the traveling wheels 5a to 5d described above. For example, when an execution switch for wheel position detection not shown is operated while the TPMS-ECU 3 is powered on by turning on an IG, the TPMS-ECU 3 enters an ID registration mode. The present process is executed every predetermined control cycle together with the process of detecting the wheel position of the traveling wheels 5a to 5d described above.

Figure 8:
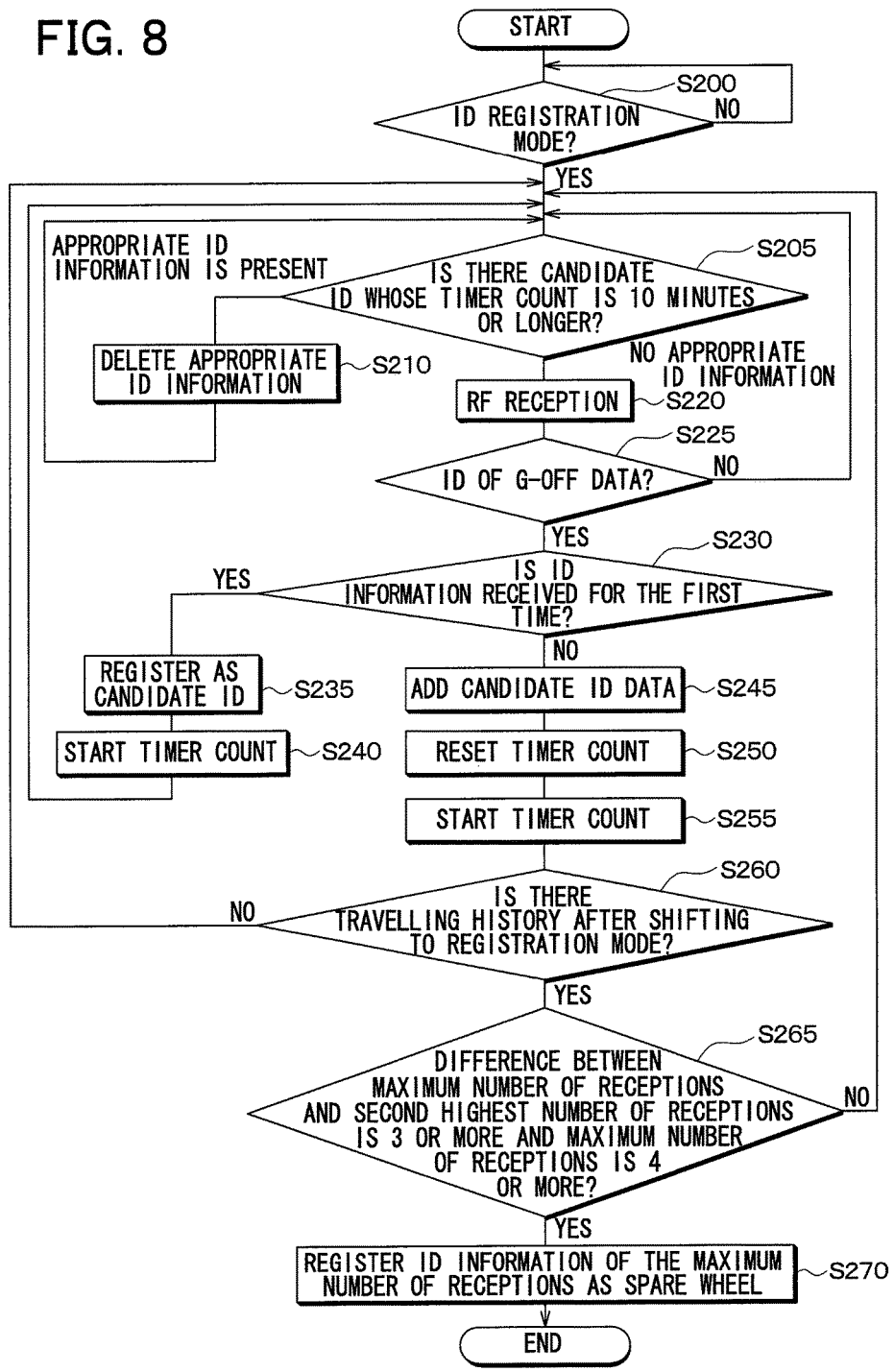
FIG. 8 is a flowchart of a spare wheel registration process to be executed by the TPMS-ECU 3.

First, with the execution of a registration start determination process illustrated in FIG. 7, it is determined whether there is a need to shift to the ID registration mode, or not. When the shift to the ID registration mode has been performed, the spare wheel registration process illustrated in FIG. 8 is executed to leave only the candidate ID which should be truly left, and the wheel position detection is performed. It is to be noted that the processes illustrated in FIGS. 7 and 8 are executed at predetermined control cycles, for example, when the TPMS-ECU 3 is powered on by turning on the IG.

As illustrated in FIG. 7, in Steps 100 to 130, it is determined whether there is a need to shift to the ID registration mode, or not.

Specifically, in Step 100, it is determined whether a request for shifting to the ID registration mode has been issued through an external tool not shown instructing the execution of wheel position detection, or not. For example, the external tool transmits a request command for shifting to the ID registration mode to the TPMS-ECU 3, and the request command may be transmitted to the TPMS-ECU 3 through radio waves or the in-vehicle LAN such as a CAN.

In Step 110, it is determined whether the request for shifting to the ID registration mode has been issued by operating an execution switch not shown for the wheel position detection or the like, or not. The execution switch for detecting the wheel position is provided, for example, in an instrument panel. When the execution switch is operated by a user, the fact is transmitted to the TPMS-ECU 3 through the in-vehicle LAN such as CAN.

In Step 120, it is determined whether the ID information on the transmitters 2 of the respective wheels 5a to 5d is in an unregistered state, or not. For example, immediately after a vehicle production has been completed, the ID information on any transmitter 2 is still unregistered and there is a need to detect the wheel positions.

In step 130, it is determined whether it is assumed that a tire change or the like has been performed, or not, based on a comparison of the number of receptions between the registered ID information and the unregistered ID information. Even in such a case, there is a need to detect the wheel position. For example, it is determined that it is assumed that a tire change or the like has been performed when the number of receptions of the unregistered ID information is larger than the number of receptions of the registered ID information by a predetermined number or more.

Therefore, if an affirmative determination is made in any one of the determination processes of Steps 100 to 130 described above, the process proceeds to Step 140 to shift to the ID registration mode and the process is terminated. If a negative determination is made in all of those determination processes, the process returns to Step 100 to repeat the above process. In this way, the registration start determination process for determining whether to start the registration of ID information on the transmitter 2 of the host vehicle by detecting the wheel position is completed.

Subsequently, in the spare wheel registration process illustrated in FIG. 8, first in Step 200, it is determined whether the ID registration mode has been set, or not. If the shift to the ID registration mode has been performed in Step 140 of FIG. 7 described above, an affirmative determination is made in this step, and the process proceeds to Step 205.

In Step 205, it is determined whether there is a candidate ID whose count value of a timer is equal to or longer than a predetermined time (for example, 10 minutes) among the candidate IDs, or not. In this example, the count value of the timer means a count value since the timer count starts in Steps 240 and 255 which will be described later and is counted for each candidate ID. The count value represents an elapsed time since the frame including each candidate ID has been received previously.

A transmission interval of the frames from the transmitter 2 varies depending on the situation, but is basically determined. For example, during a period when the wheel position detection may be executed, such as at the traveling start of the vehicle, a wheel position determination mode is set and the transmission interval of the frames becomes relatively short. When the time assumed to be necessary for the wheel position detection elapses, the mode is switched to a regular transmission mode, and the frame transmission is performed at a longer fixed cycle. Further, while the vehicle is stopped, there may be a case in which a stopping transmission mode is set for setting a transmission cycle longer than the regular transmission mode and the frame transmission is performed at a longer fixed cycle. However, even in any of those modes, the frame transmission is performed within a certain period of time, and the frame reception is performed on the TPMS-ECU 3 side.

In particular, the TPMS is specified on the system so that the frames transmitted from the transmitter 2 of the host vehicle are received at least once within a predetermined time period, and such a specification is mandated by laws and regulations in some countries. For example, it is stipulated that the frame transmitted from the transmitter 2 of the host vehicle is received during a predetermined period of 20 minutes in North America and 10 minutes in Europe.

Therefore, during at least the predetermined period, the frames transmitted from each transmitter 2 of the host vehicle are received by the TPMS-ECU 3, and the candidate IDs not received during the predetermined period can be determined not to be the ID information on the machine 2 of the host vehicle.

Therefore, as described above, if it is determined in Step 205 that the corresponding ID is present, the process proceeds to Step 210, the corresponding ID is deleted from the candidate IDs, and then the process returns to Step 205.

In this way, the ID information which has never been received during the predetermined period is excluded from the candidate ID. As a result, the amount of data stored in the memory of the TPMS-ECU 3 is reduced, and overflowing due to reaching a memory capacity can be reduced. In addition, because the candidate ID that has not been received for a long time can be excluded from the candidate IDs, the wheel position detection can be performed more quickly.

On the other hand, if it is determined in Step 205 that the corresponding ID is not present, the process proceeds to Step 220. When RF reception, that is, the frame transmitted as a radio wave of an RF band is received, processes in Step 225 and the subsequent steps are executed.

In Step 225, it is determined whether G-OFF data has been stored as data indicating the state of the acceleration sensor 22 in the received frame, or not. In other words, it is determined whether the acceleration sensor 22 provided in the transmitter 2 that has transmitted the received frame is not in an on state, or not.

In the case of the traveling wheels 5a to 5d, when the host vehicle is traveling, if the wheel speeds of the traveling wheels 5a to 5d have reached a predetermined speed, G-ON data is stored in the frames of the transmitters 2 attached to the traveling wheels 5a to 5d. However, in the case of the spare wheel 5e, since the spare wheel 5e is not rotated even if the vehicle is traveling, G-OFF data is stored in the frame of the transmitter 2 attached to the spare wheel 5e. Therefore, if the G-OFF data is stored in the received frame, there is a possibility that the received frame has been transmitted from the transmitter 2 of the spare wheel 5e. Accordingly, if an affirmative determination is made in this step, the process proceeds to Step 230 and the subsequent steps, and if a negative determination is made, the process returns to Step 205.

In Step 230, it is determined whether the ID information stored in the currently received frame is the ID received for the first time, or not. In this example, if an affirmative determination is made, the process proceeds to Step 235 and the ID information is registered as the candidate ID. Then, the process proceeds to Step 240, and the timer count for the candidate ID is started.

On the other hand, if a negative determination is made in Step 230, since the ID information stored in the frame received this time has already been registered as the candidate ID, the process proceeds to Step 245 and the number of receptions of the registered candidate ID is added.

Thereafter, the process proceeds to Step 250 to temporarily reset the timer count for the candidate ID, and then the process proceeds to Step 255 to start the timer count for the candidate ID. As a result, the timer count for the candidate ID is performed again from the beginning.

Thereafter, the process proceeds to Step 260 and subsequent steps, and it is determined whether there is a travel history after entering the registration mode, or not. For example, when the period during which the vehicle state becomes in a traveling state has reached a predetermined period or longer after shifting to the registration mode in Step 140 of FIG. 7, a fact that the travel history has been present is stored. In this example, the predetermined period is set to the transmission cycle of the frame of the transmitter 2 in the spare wheel 5*e*, that is, to a time equal to or longer than the transmission cycle longer than the transmission cycle at the regular transmission mode. The predetermined period is set to a time when the frame transmitted from the transmitter 2 of the spare wheel 5*e* is received by the receiver 3 once or more. Whether the vehicle state is traveling, or not, can be determined by acquiring vehicle speed data from the brake ECU 10 since the brake ECU 10 calculates the vehicle speed based on the detection signals of the wheel speed sensors 11*a* to 11*d*.

In this example, it is determined whether there is the travel history after shifting to the registration mode, or not, and the reason will be described.

In the case where there is the travel history after shifting to the registration mode, basically, the candidate ID is registered under circumstances in which a specific vehicle is not present around. For that reason, it is considered that the frame reception from the transmitter 2 of the spare wheel 5*e* has been performed, and the ID information on the transmitter 2 of the spare wheel 5*e* in the host vehicle has already been registered as the candidate ID.

On the other hand, if there is no travel history after shifting to the registration mode, there is a possibility that the candidate ID is registered in a situation where a specific vehicle is present around. For example, the candidate ID may be registered under the situation where multiple vehicles are stopped around such as a parking lot or a signal waiting. In this case, there is a possibility that the ID information on the transmitter of the wheel of another vehicle is registered as the candidate ID and the information reaches the memory capacity before the ID information on the transmitter 2 of the spare wheel 5*e* in the host vehicle is registered as the candidate ID. In such a case, there is a possibility that the ID information on the transmitter 2 of the spare wheel 5*e* in the host vehicle cannot be registered in the candidate ID.

Therefore, in Step 260, it is determined whether there is the travel history after shifting to the registration mode, or not. If an affirmative determination is made, the ID information on the transmitter 2 of the spare wheel 5*e* in the host vehicle has already been registered in the candidate ID, and the process proceeds to Step 265. If a negative determination is made in Step 260, there is a possibility that the ID information on the transmitter 2 of the spare wheel 5*e* in the host vehicle has not been registered in the candidate ID, and the process returns to Step 205.

If a negative determination is made in Step 260 as described above, since the frame including the ID information temporarily registered as the candidate ID when the vehicle travels is not then received, thereafter is no longer performed, it is determined that the corresponding ID information is present in Step 205. As a result, the ID information on the transmitters of the other vehicles is excluded so that the memory capacity can be made free. As a result, even if the ID information on the transmitter 2 of the spare wheel 5*e* in the host vehicle has not been registered in the candidate ID, the ID information in the spare wheel 5*e* is registered as the candidate ID in association with the free memory capacity.

Then, the process proceeds to Step 265, and it is determined whether the received frame is transmitted from the transmitter 2 of the spare wheel 5*e* in the host vehicle or the transmitter of the other vehicle. Then, if the frame is transmitted from the transmitter 2 of the spare wheel 5*e* in the host vehicle, the ID information on the frame is registered as the ID information of the spare wheel 5*e*.

More specifically, in Step 265, it is determined whether a difference between the maximum number of receptions and the second highest number of receptions is 3 or more, and the maximum number of receptions is 4 or more, or not. As a result, it is determined whether the received frame is a frame transmitted from the transmitter 2 of the spare wheel 5*e* in the host vehicle or a frame transmitted from the transmitter of the other vehicle. This will be described with reference to time chart examples illustrated in FIGS. 9 and 10.

In the case where a vehicle state of the host vehicle is traveling, when the G-OFF data is stored in the received frame, it is basically assumed that the frame has been transmitted from the transmitter 2 attached to the spare wheel 5*e* in the host vehicle. However, there may be cases where the transmitter 2 of the spare wheel 5*e* in the host vehicle has not transmitted the frame. For example, when there is another vehicle traveling alongside the host vehicle, there is a possibility that the frame has been transmitted from the transmitter of a spare wheel of another vehicle. Also, when another vehicle or a wheel is loaded on the host vehicle, there is a possibility that the frame has been transmitted from a transmitter of a wheel of the located another vehicle or the loaded wheel.

However, after loading, since the loaded another vehicle or the loaded wheel is separated from the host vehicle, the frame transmitted from the transmitter of the wheel of the loaded another vehicle or the loaded wheel cannot be received. For that reason, the difference occurs in the number of frames received, and it can be discriminated that the frame larger in the number of receptions is transmitted from the transmitter 2 of the spare wheel 5*e* in the host vehicle, and the frame smaller in the number of reception is transmitted from the wheel of the another vehicle or the loaded wheel.

Figure 9:
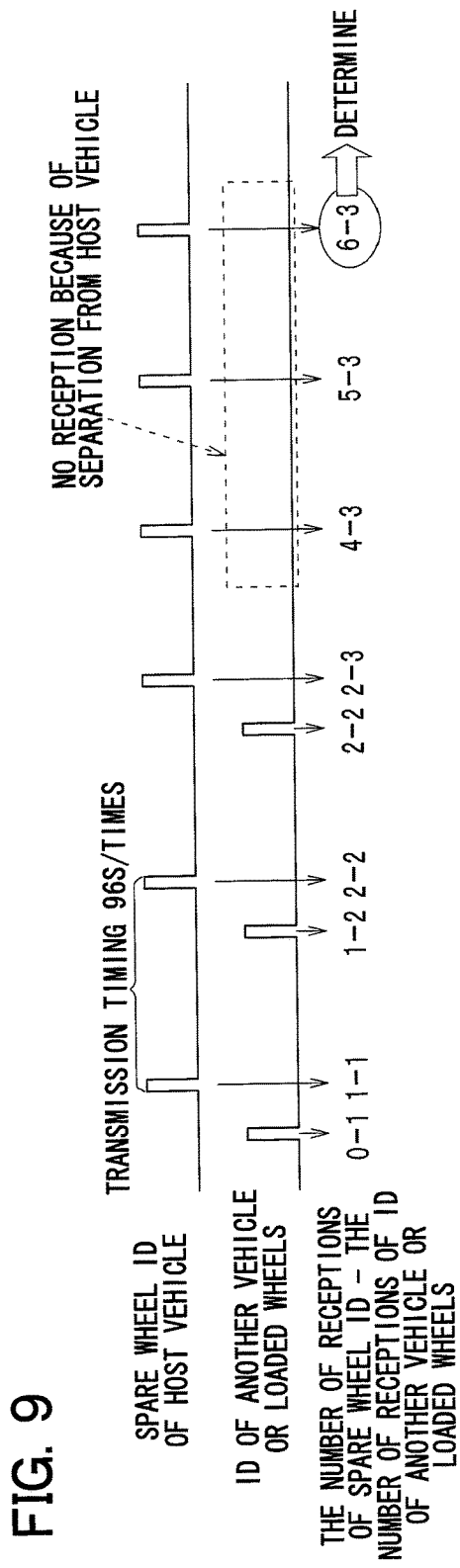
FIG. 9 is a time chart when receiving frames from spare wheels of the host vehicle and another vehicle.

For example, as illustrated in FIG. 9, it is assumed that the frame transmitted from the transmitter 2 of the spare wheel 5*e* in the host vehicle and the frame transmitted from the transmitter of another vehicle or the loaded wheel are received every predetermined transmission timing of the frames (for example, at intervals of 96 s). The transmitter 2 normally performs the acceleration detection and the like at a low frequency (for example, at intervals of 16 s) in order to reduce the current consumption, and when the acceleration sensor 22 is not in the on state, the transmitter 2 performs the acceleration detection and the like at a further lower frequency (for example, at intervals of 96 s) than usual.

In this example, it is assumed that a frame transmitted from the transmitter of another vehicle or the loaded wheel is first received, and a frame transmitted from the transmitter 2 of the spare wheel 5e in the host vehicle is then received.

In that case, immediately after the frame transmitted from the transmitter of another vehicle or the loaded wheel has first been received, the frame transmitted from the transmitter 2 of the spare wheel 5e has not yet been received. For that reason, the difference between the maximum number of receptions and the second largest number of receptions is 1 because the number of receptions of the frames transmitted from the transmitter 2 of the spare wheel 5e is 0, and the number of receptions of the frames transmitted from the transmitter of another vehicle or the loaded wheel is 1.

Subsequently, when the frame transmitted from the transmitter 2 of the spare wheel 5e has been received, the difference between the maximum number of receptions and the second largest number of receptions becomes 0 because the number of receptions of the frames transmitted from the transmitter 2 of the spare wheel 5e is 1, and the number of receptions of the frames transmitted from the transmitter of another vehicle or the loaded wheel is 1. As described above, after a state in which the difference between the maximum number of receptions and the second largest number of receptions is 0 or 1 has been repeated, after loading, when the loaded another vehicle or the loaded wheel leave the host vehicle, the number of receptions of the frames transmitted from the transmitter of another vehicle or the loaded wheel does not increase. For that reason, the difference between the maximum number of receptions and the second largest number of receptions is finally three or more, and the ID information on the frames of the maximum number of receptions can be discriminated as the ID information on the transmitter 2 of the spare wheel 5e.

Figure 10:
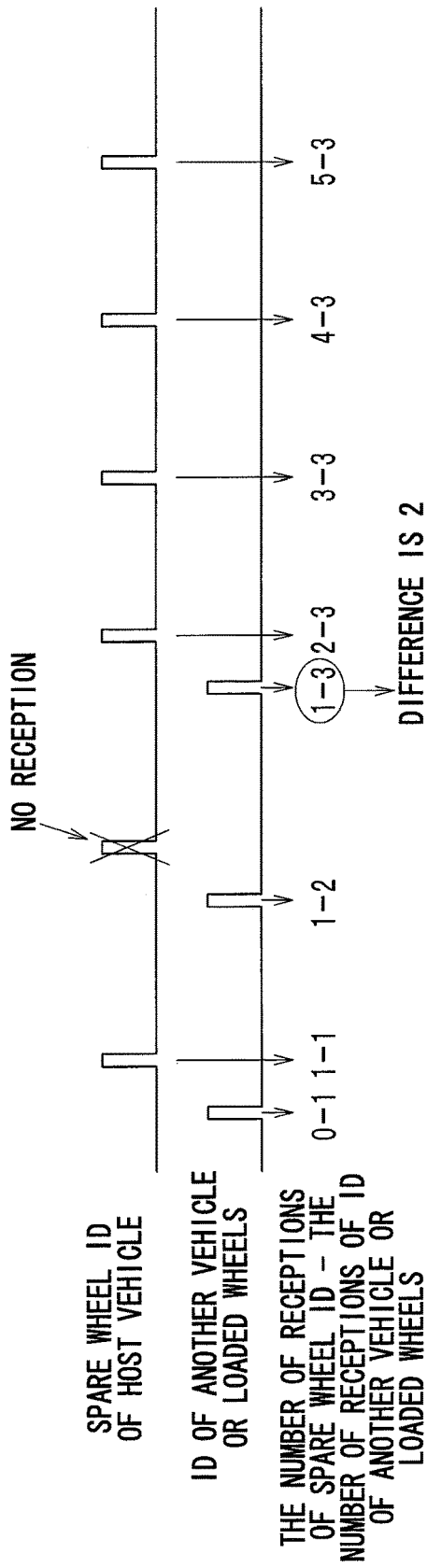
FIG. 10 is a time chart when receiving frames from spare wheels of the host vehicle and another vehicle.

In this example, when the difference between the maximum number of receptions and the second largest number of receptions becomes two or more, and the ID information on the frames of the maximum number of receptions can be discriminated as the ID information on the transmitter 2 of the spare wheel 5e. However, the frame transmitted by the transmitter 2 of the spare wheel 5e may not be received by the TPMS-ECU 3 due to collision of data at the time of transmission or interference of jamming radio waves or the like. In that case, as illustrated in FIG. 10, when the frame transmitted from the transmitter 2 of the spare wheel 5e has not been received by the TPMS-ECU 3, the difference between the maximum number of receptions and the second highest number of receptions becomes two.

Therefore, when the difference between the maximum number of receptions and the second largest number of receptions becomes three or more, and the ID information on the frames of the maximum number of receptions is discriminated as the ID information on the transmitter 2 of the spare wheel 5e. As a result, the ID information on the transmitter of the loaded another vehicle or the loaded wheel can be prevented from being erroneously registered as the ID information of the transmitter 2 of the spare wheel 5e in the host vehicle due to one data missing. In particular, as the transmission timing is shorter, data collision is likely to occur, and there is a possibility that the frame transmitted by the transmitter of the spare wheel 5e cannot be received by the TPMS-ECU 3.

As in the present embodiment, it is effective to set the difference between the maximum number of receptions and the second largest number of receptions to three or more.

It should be noted that, in Step 265, it is also determined that the maximum number of receptions is four or more. This is because the reliability is improved by securing a certain number of receptions since only three receptions may be too small. Although the maximum number of receptions is set to four or more in this example, the reliability is improved more as a lower limit value is larger. However, because it takes more time to detect the wheel position as the lower limit value is larger, the lower limit value of the maximum number of receptions is set to four times. It is needless to say that the determination item of the maximum number of receptions is not an indispensable item in the determination of Step 265, but the difference between the maximum number of receptions and the second highest number of receptions may be merely used as a determination item.

As described above, in Step 265, it is determined that there is the difference between the maximum number of receptions and the second largest number of receptions. When an affirmative determination is made in Step 265, the process proceeds to Step 270 to register the ID information on the frame of the maximum number of receptions as the ID information on the transmitter 2 of the spare wheel 5e in the host vehicle, to thereby complete the registration of the ID information on the transmitter 2 of the spare wheel 5e.

When the wheel position is detected in the above manner, the tire pressure is then detected. More specifically, at the time of detecting the tire pressure, the frames are transmitted from the respective transmitters 2 at regular intervals, and each time the frames are transmitted from the respective transmitters 2, the frames of four wheels of the traveling wheels and the spare wheel are received by the TPMS-ECU 3. Then, the TPMS-ECU 3 identifies which frame is transmitted from any of the transmitters 2 attached to the wheels 5a to 5e based on the ID information stored in the respective frames, and detects the tire pressures of the respective wheels 5a to 5e according to the information on the tire pressure. As a result, the TPMS-ECU 3 can detect a decrease in the tire pressures of the respective wheels 5a to 5e, and can identify which tire pressure of the wheels 5a to 5e is decreased. Then, when the decrease in the tire pressure is detected, the fact is transferred to the meter 4, and the meter 4 displays the decrease in the tire pressure while identifying the wheels 5a to 5e, and notifies the driver of the decrease in the tire pressure of the specific wheel.

In that case, the spare wheel 5e is excluded from a notification target at the time of the decrease in the tire pressure because there is no trouble in traveling even if the tire pressure is low, and only when the tire pressure of the traveling wheels 5a to 5d is reduced, the decrease in the tire pressure may be notified.

As described above, the gear information indicating the tooth positions of the gears 12a to 12d is acquired every predetermined cycle based on the detection signals of the wheel speed sensors 11a to 11d that detect the passage of the teeth of the gears 12a to 12d rotated in conjunction with the wheels 5a to 5d. The allowable variation range is set based on the tooth position at the reception timing of the frames. If the tooth position at the reception timing of the frames after the allowable variation range has been set falls outside the allowable variation range, the wheels are excluded from the candidates of the wheels to which the respective transmitters 2 that have transmitted the frames are attached, and the remaining wheels are registered as the wheels to which the respective transmitters 2 that have transmitted the frames are attached. For that reason, the wheel positions of the traveling wheels 5a to 5d can be identified even if a large amount of data is not obtained.

In addition, as a spare wheel registration process, it is determined whether the G-OFF data has been stored when the vehicle state is traveling, or not, and only ID information on the frame in which the G-OFF data has been stored during traveling is registered as the candidate ID of the spare wheel 5e. The ID information on the spare wheel 5e is identified from the registered IDs. More specifically, it is confirmed that there is the travel history after shifting to the registration mode, and only when there is the travel history, the data belonging to the host vehicle and the data belonging to other vehicles are discriminated from each other in the frames in which the G-OFF data is stored. For example, it is determined whether the difference between the maximum number of receptions of the frames stored with the G-OFF data and the second largest number of receptions is equal to or greater than a predetermined number (for example, 3), or nor. This makes it possible to prevent the ID information on the spare wheel 5e from being determined when the ID information on the transmitter 2 of the spare wheel 5e in the host vehicle is not registered in the candidate ID due to a full capacity of a memory or the like . Therefore, the ID information on the transmitter of the surrounding vehicles, the loaded another vehicle, or the loaded wheel can be prevented from being erroneously registered as the ID information on the transmitter 2 of the spare wheel 5e in the host vehicle.

Even if there is the traveling history after shifting to the registration mode, a difference in the number of receptions of the frames transmitted from the transmitter 2 of the spare wheel 5e in the host vehicle and the transmitter of the spare wheel of another vehicle may be small. In that case, although the frame transmitted from the transmitter 2 of the spare wheel 5e in the host vehicle cannot be identified, for example since a difference occurs in the number of receptions of the frames when leaving the surrounding vehicles, the ID information on the frame transmitted from the transmitter of the spare wheel 5e in the host vehicle can be registered at that time.

For example, as illustrated in FIG. 11, when stopping at a first parking lot immediately after shifting to the registration mode, it is assumed that ID information ID0A to ID0X of the transmitter of another vehicle is registered as the candidate IDs in addition to the ID information ID00 of the transmitter 2 of the spare wheel 5e in the host vehicle. Even in that case, when the host vehicle is moved from the first parking lot, the old candidate ID is deleted when the timer count has elapsed 10 minutes. For that reason, a difference occurs in the maximum number of receptions of the frames, and the ID information on the transmitter 2 of the spare wheel 5e in the host vehicle is accurately registered as the ID information on the transmitter 2 of the spare wheel 4e. Even if the host vehicle immediately stops at a second parking lot and ID information ID0a to ID0x of the transmitter of another vehicle is newly registered as the candidate IDs as illustrated in FIG. 11, a difference occurs in the number of receptions of the frames. For that reason, even in this case, the ID information on the transmitter 2 of the spare wheel 5e in the host vehicle is correctly registered as the ID information on the transmitter 2 of the spare wheel 4e.

Since the ID information on the transmitters 2 of the traveling wheels 5a to 5d and the spare wheel 5e can be registered in this manner, an antenna is not required for each wheel, thereby being capable of avoiding an increase in the number of components and an increase in the cost caused by the need of additional components.

(Second Embodiment)

A second embodiment of the present disclosure will be described. In the present embodiment, the process to be executed in Step 260 of FIG. 8 described in the first embodiment is changed, and the other processes are identical with those in the first embodiment. Therefore, only parts different from those in the first embodiment will be described.

Figure 12:
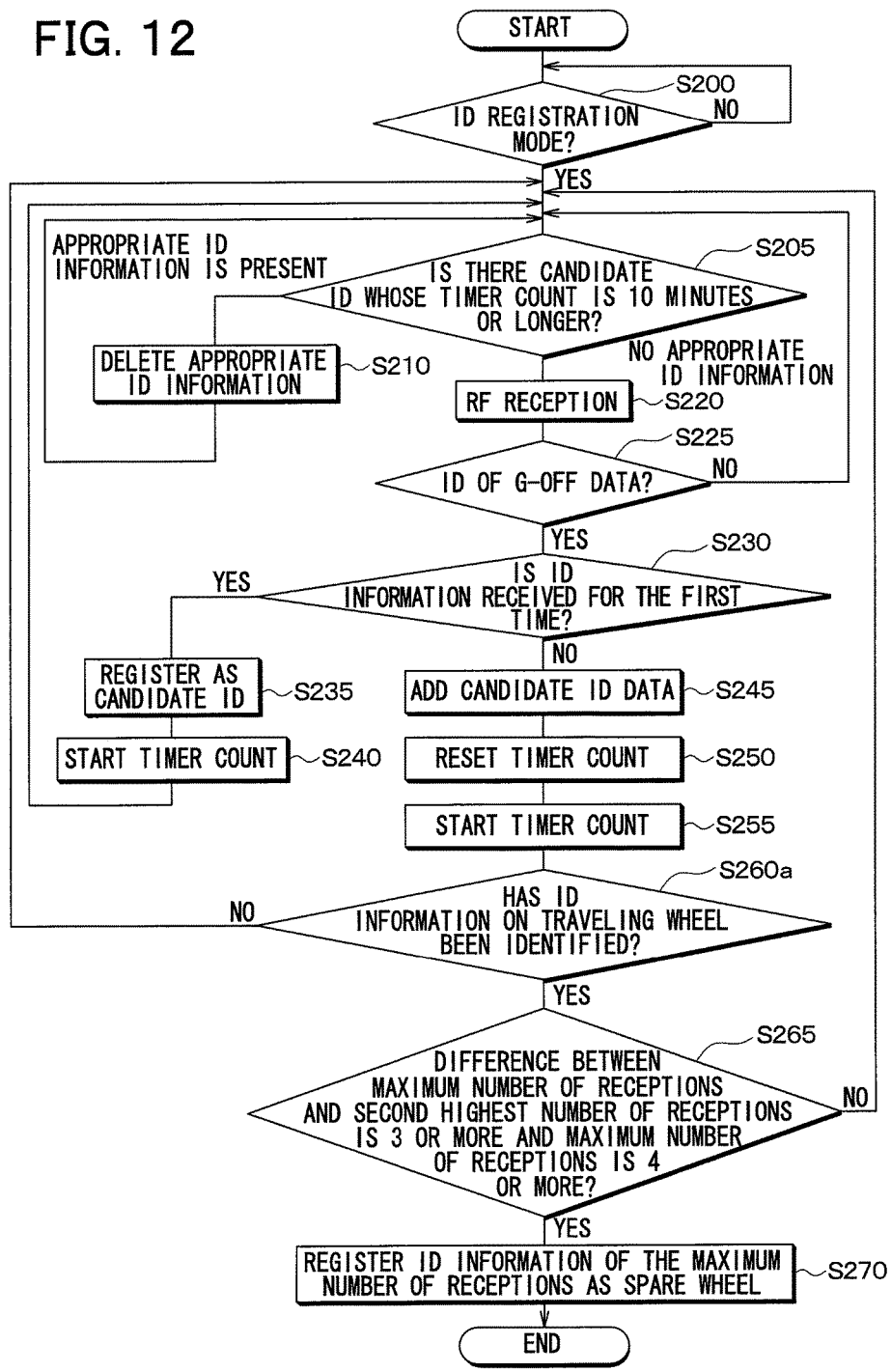
FIG. 12 is a flowchart of a spare wheel registration process to be executed by the TPMS-ECU 3 described in the second embodiment of the present disclosure.

As illustrated in FIG. 12, in the present embodiment, a spare wheel registration process is executed as in the first embodiment. However, Step 260 is replaced with the process of Step 260a.

More specifically, in Step 260a, it is determined whether identification of the ID information on the traveling wheels 5a to 5d has been completed, or not. The identification of the ID information of the traveling wheels 5a to 5d is not completed unless there is the travel history after shifting to the registration mode. For that reason, the completion of identification of the ID information of the traveling wheels 5a to 5d is one of the results made when there is the travel history after shifting to the registration mode. Accordingly, if an affirmative determination is made in Step 260a, the process proceeds to step 265 and subsequent steps, and the same process as that in the first embodiment is performed.

In this way, it can be determined that there is the travel history after shifting to the registration mode based on the event that is made as the result. As a result, the same effects as those of the first embodiment can be obtained.

(Other Embodiments)

For example, a criterion for determining whether there is a travel history, or not, in Step 260 of FIG. 8 described in the first embodiment may be changed appropriately. For example, as illustrated in Step 260a of FIG. 12 described in the second embodiment, whether there is the travel history after shifting to a registration mode, or not, based on an event that is made as a result of the case where the travel history has been made after shifting to the registration mode. Also, the criterion for determining that there is the travel history may be changed. For example, in the first embodiment described above, it is assumed that there is the travel history when the period during which the vehicle state is traveling has reached a predetermined period or longer after shifting to the registration mode. On the other hand, another criterion can also be applied such as a case in which there is the travel history when a traveling distance after shifting to the registration mode reaches a predetermined distance.

In the above embodiment, as an example of detecting the wheel position on the traveling wheels 5a to 5d side, the allowable variation range is changed at each reception timing of the frame so that the allowable variation range is gradually narrowed. However, the method of detecting the wheel position on the traveling wheels 5a to 5d side may be performed by other techniques.

In the embodiment described above, the allowable variation range is changed for each reception timing of the frame so that the allowable variation range gradually becomes narrower, but the allowable variation range set centered on the tooth position is kept constant. The allowable variation range set centered on the tooth position can be also changed. For example, there is a possibility that the variation in the tooth position increases more as a vehicle speed increases more. For that reason, the allowable variation range is set to be larger as the vehicle speed increases more, thereby being capable of setting a more precise allowable variation range. In addition, the detection accuracy of the timing when an angle of the acceleration sensor 22 reaches a predetermined angle decreases as a sampling cycle when the acceleration detection is performed by the acceleration sensor 22 is longer. Therefore, the allowable variation range is changed according to the detection accuracy, thereby being capable of setting a more accurate allowable variation range. In that case, since the transmitter 2 side grasps the sampling cycle and the like, data for determining a magnitude of the allowable variation range can be included in the frame transmitted by the transmitter 2, and transmitted.

Further, in the above-described embodiment, as an angle at which the frame transmission is performed, a position at which the angle is 0° is set when the acceleration sensor 22 is located at an upper position centered on the center axes of the respective wheels 5a to 5d. However, this is merely an example, and an arbitrary position in a circumferential direction of the wheel may be set to an angle of 0°.

In the above embodiment, the TPMS-ECU 3 acquires the gear information from the brake ECU 10. However, since it is sufficient for the TPMS-ECU 3 to acquire the number of edges of the teeth of a gear or the number of teeth as the gear information, the number of teeth may be obtained from another ECU, or the TPMS-ECU 3 may receive the detection signals of the wheel speed sensors 11a to 11d, and acquire the number of edges of the teeth or the number of teeth of the gear according to the detection signal. Particularly, in the above embodiment, the case where the TPMS-ECU 3 and the brake ECU 10 are configured by separate ECUs has been described, but there may be a case in which those ECUs are configured by a single integrated ECU. In that case, the ECU directly receives the detection signals of the wheel speed sensors 11a to 11d and acquires the number of edges of the teeth of the gear or the number of teeth according to the detection signal. Also, in that case, since the number of edges of the teeth of the gear or the number of teeth can be acquired all the time, unlike the case where those pieces of information is acquired every predetermined cycle, the wheel position can be detected on the basis of the gear information just before the reception timing of the frames.

Further, in the above embodiment, the wheel position detection device provided for the vehicle 1 including the traveling wheels 5a to 5d and the spare wheel 5e has been described. However, the present disclosure can be similarly applied to the vehicle having more traveling wheels and more spare wheels.

In the present disclosure, the wheel speed sensors 11a to 11d can detect the passage of teeth of the gear rotated in conjunction with the rotation of the wheels 5a to 5d. For that reason, the gears may be of a structure having different magnetoresistance in which portions of the teeth whose outer peripheral surfaces function as conductors and portions located between the teeth are alternately repeated. In other words, the gear includes not only a general configuration having an uneven outer edge portion including a convex portion whose outer peripheral portion is conductor and a non-conductor space, but also, for example, a rotor switch including a portion whose outer peripheral surface is conductor and a non-conductor insulator, and so on (for example, refer to JP-A-Hei 10 (1998)-048233).

It should be noted that the steps illustrated in the respective drawings correspond to devices that execute various processes. In other words, a portion that executes the process of Step 225 corresponds a first determination device, a portion that executes the process of Step 260 corresponds a second determination device, a portion that executes the process of Step 230 corresponds a third determination device, and a portion that executes the process of Step 265 corresponds to a fourth determination device. In addition, a portion that executes the process of Step 235 corresponds to a candidate registration device, a portion that executes the process of Step 245 corresponds to a reception number adding device, and a portion that executes the process of Step 270 corresponds to a registration device.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A wheel position detection device for a vehicle in which a plurality of wheels including a traveling wheel having a tire and a spare wheel are attached to a vehicle body, the wheel position detection device comprising:

a transmitter that is disposed in each of the plurality of wheels, and includes a first control unit for creating and transmitting a frame with unique identification information; and a receiver that is disposed on a vehicle body side, and includes a second control unit for performing a wheel position detection to receive the frame transmitted from the transmitter through a reception antenna when shifting to a predetermined registration mode, to identify which wheel the transmitter that transmits the frame is attached to, according to the unique identification information in the frame, and to register the identification information of the transmitter disposed in each of the plurality of wheels in association with one of the plurality of wheels, wherein:

the transmitter includes an acceleration sensor for outputting a detection signal corresponding to an acceleration which varies with a rotation of one of the wheels which the transmitter is attached to, and has a function as a function of the first control unit for detecting a feature that a wheel speed of the one of the wheels which the transmitter is attached to reaches a predetermined speed at which the acceleration sensor is in an on-state to detect the acceleration, and for storing data indicative of a state of the acceleration sensor in the frame based on a detection result of the feature;

the second control unit of the receiver includes:

a first determination device that determines whether the data indicative of the state of the acceleration sensor stored in a received frame satisfies a condition in which the acceleration sensor is not in the on-state;

a candidate registration device that registers a candidate of the identification information of the spare wheel when the first determination device determines that the condition is satisfied;

a second determination device that determines whether a travel history of the vehicle is present after shifting to the registration mode; and a registration device that identifies the identification information of the spare wheel among registered candidates of the identification information of the spare wheel when the second determination device determines that the travel history is present, and registers the identification information in association with the spare wheel;

the second control unit further includes:

a third determination device that determines whether the identification information stored in the frame is received for a first time when the first determination device determines that the condition is satisfied, and controls the candidate registration device to register the candidate of the identification information of the spare wheel when the identification information stored in the frame is received for the first time;

a reception number adding device that adds a numerical number of receiving times of the identification information stored in the received frame among the candidates of the identification information of the spare wheel already registered in the candidate registration device when the third determination device determines that the identification information is not received for the first time; and a fourth determination device that determines whether a difference between a maximum numerical number of receiving times, which is a largest numerical number of receiving times, and a second largest numerical number of receiving times among the candidates of the identification information of the spare wheel added by the reception number adding device is equal to or larger than a predetermined value; and the registration device registers the candidate of the identification information of the spare wheel, which has the maximum numerical number of receiving times, as the identification information of the spare wheel when the fourth determination device determines that the difference is equal to or larger than the predetermined value.

2. The wheel position detection device according to claim 1, wherein:

the second determination device determines that the travel history is present when a traveling time of the vehicle is equal to or longer than a predetermined time after shifting to the registration mode.

3. The wheel position detection device according to claim 1, wherein:

the second determination device determines that the travel history is present when the wheel position detection of the traveling wheel is completed after shifting to the registration mode.

4. The wheel position detection device according to claim 1, wherein:

the fourth determination device determines whether the difference is equal to or larger than three as the predetermined value.

5. A tire pressure detection system comprising:

the wheel position detection device according to claim 1, wherein:

the transmitter further includes a sensing unit for outputting a detection signal corresponding to an air pressure of the tire equipped in each of the plurality of wheels;

the transmitter stores information, relating to the air pressure of the tire obtained by processing the detection signal from the sensing unit through the first control unit, in the frame, and transmits the frame to the receiver; and the second control unit in the receiver detects the air pressure of the tire equipped in each of the plurality of wheels based on the information relating to the air pressure of the tire.

* * * * *